US010853397B2

(12) United States Patent
Lisa et al.

(10) Patent No.: US 10,853,397 B2
(45) Date of Patent: Dec. 1, 2020

(54) SYSTEM, METHODS AND APPLICATIONS FOR EMBEDDED INTERNET SEARCHING AND RESULT DISPLAY

(71) Applicant: Search Perfect, LLC, Scottsdale, AZ (US)

(72) Inventors: Steven G. Lisa, Paradise Valley, AZ (US); Jeffrey C. Konicek, Tolono, IL (US)

(*) Notice: Subject to any disclaimer, the term of this patent is extended or adjusted under 35 U.S.C. 154(b) by 31 days.

(21) Appl. No.: 16/352,591

(22) Filed: Mar. 13, 2019

(65) Prior Publication Data
US 2019/0213207 A1    Jul. 11, 2019

Related U.S. Application Data

(63) Continuation of application No. 15/409,811, filed on Jan. 19, 2017, now Pat. No. 10,275,520, which is a
(Continued)

(51) Int. Cl.
G06F 16/338       (2019.01)
G06F 16/93        (2019.01)
(Continued)

(52) U.S. Cl.
CPC .......... *G06F 16/338* (2019.01); *G06F 3/0488* (2013.01); *G06F 3/04817* (2013.01);
(Continued)

(58) Field of Classification Search
CPC .... G06F 16/338; G06F 16/93; G06F 16/9535; G06F 16/951; G06F 16/248
(Continued)

(56) References Cited

U.S. PATENT DOCUMENTS 5,598,557 A    1/1997  Doner et al.
5,692,176 A    11/1997 Holt et al.
(Continued)

FOREIGN PATENT DOCUMENTS

EP        1399844 A2      8/2001
WO    WO2003007189        1/2003
WO    WO2006/081472       8/2006

OTHER PUBLICATIONS

"The New Electronic Encyclopedia", Reference Books Bulletin, Booklist, Jul. 1989, pp. 1878-1879.
(Continued)

*Primary Examiner* — Kimberly L Wilson
(74) *Attorney, Agent, or Firm* — Law Offices of Lisa & Lesko, LLC; Justin Lesko, Esq.

(57) ABSTRACT

Systems and methods allow a user of a text or graphics editor to quickly create multiple robust internet search queries by selecting and ranking groups or individual key words from a document. A user who is composing or reading a document can identify and link multiple sets of key words into separate search queries by highlighting and assigning either unique search numbers, colors or other readily ascertained indicators of their logical relation. Each individual search query is routed to selected internet search engines, and the results are returned to the user in the same viewed document. The user may select the form in which the results are displayed. For example, results may be listed within the document by way footnotes, endnotes, or separate hover or pull-down windows accessible from the search terms. In addition, the user can browse, sort, rank, edit or eliminate portions of the results.

4 Claims, 15 Drawing Sheets

Related U.S. Application Data continuation of application No. 14/516,477, filed on Oct. 16, 2014, now Pat. No. 9,582,580, which is a continuation of application No. 14/247,046, filed on Apr. 7, 2014, now Pat. No. 8,996,522, which is a continuation of application No. 11/397,833, filed on Apr. 3, 2006, now Pat. No. 8,725,729.

(51) Int. Cl.

| | | |
|---|---|---|
| G06F 16/248 | (2019.01) | |
| G06F 16/951 | (2019.01) | |
| G06F 16/332 | (2019.01) | |
| G06F 16/9535 | (2019.01) | |
| G06F 40/166 | (2020.01) | |
| G06F 3/0481 | (2013.01) | |
| G06F 3/0488 | (2013.01) | |

(52) U.S. Cl.
CPC ........ *G06F 16/248* (2019.01); *G06F 16/3328* (2019.01); *G06F 16/93* (2019.01); *G06F 16/951* (2019.01); *G06F 16/9535* (2019.01); *G06F 40/166* (2020.01)

(58) Field of Classification Search
USPC ....................................................... 707/722
See application file for complete search history.

(56) References Cited

U.S. PATENT DOCUMENTS

| | | |
|---|---|---|
| 5,701,473 A | 12/1997 | Braseth et al. |
| 5,724,571 A | 3/1998 | Woods |
| 5,873,107 A | 2/1999 | Borovoy et al. |
| 5,893,092 A | 4/1999 | Driscoll |
| 5,909,678 A | 6/1999 | Bergman et al. |
| 5,920,854 A | 7/1999 | Kirsch et al. |
| 5,930,791 A | 7/1999 | Leu |
| 5,950,194 A | 9/1999 | Bennett |
| 5,982,370 A | 11/1999 | Kamper |
| 6,026,409 A | 2/2000 | Blumenthal |
| 6,081,829 A | 6/2000 | Sidana |
| 6,125,361 A | 9/2000 | Chakrabarti et al. |
| 6,175,830 B1 | 1/2001 | Maynard |
| 6,216,123 B1 | 4/2001 | Robertson et al. |
| 6,338,059 B1 | 1/2002 | Fields et al. |
| 6,434,556 B1 | 8/2002 | Levin et al. |
| 6,480,210 B1 | 11/2002 | Martino et al. |
| 6,507,338 B1 | 1/2003 | Liao et al. |
| 6,519,631 B1 | 2/2003 | Rosenschein et al. |
| 6,529,897 B1 | 3/2003 | Corl et al. |
| 6,556,987 B1 | 4/2003 | Brown et al. |
| 6,564,208 B1 | 5/2003 | Littlefield et al. |
| 6,636,854 B2 | 10/2003 | Dutta et al. |
| 6,646,632 B2 | 11/2003 | Wegmuller et al. |
| 6,675,159 B1 | 1/2004 | Lin et al. |
| 6,711,567 B2 | 3/2004 | Littlefield et al. |
| 6,740,863 B2 | 5/2004 | Sawyer et al. |
| 6,756,965 B2 | 6/2004 | Combs et al. |
| 6,781,570 B1 | 8/2004 | Arrigo et al. |
| 6,785,670 B1 | 8/2004 | Chiang et al. |
| 6,785,563 B2 | 9/2004 | Tsukamoto |
| 6,798,397 B2 | 9/2004 | O'Keeffe et al. |
| 6,828,988 B2 | 12/2004 | Hudson et al. |
| 6,834,372 B1 | 12/2004 | Becker et al. |
| 6,839,702 B1 | 1/2005 | Patel et al. |
| 6,862,710 B1 | 3/2005 | Marchisio |
| 6,886,137 B2 | 4/2005 | Peck et al. |
| 6,892,597 B2 | 5/2005 | Tews |
| 6,918,091 B2 | 7/2005 | Leavitt et al. |
| 6,927,758 B1 | 8/2005 | Piot et al. |
| 6,938,221 B2 | 8/2005 | Nguyen |
| 6,943,754 B2 | 9/2005 | Aughey et al. |
| 6,956,593 B1 | 10/2005 | Gupta et al. |
| 6,957,396 B2 | 10/2005 | Iwamura |
| 6,968,332 B1 | 11/2005 | Milic-Frayling et al. |
| 6,985,856 B2 | 1/2006 | Packingham et al. |
| 6,990,445 B2 | 1/2006 | Ky |
| 6,993,486 B2 | 1/2006 | Shimakawa |
| 7,003,719 B1 | 2/2006 | Rosenoff et al. |
| 7,152,059 B2 | 12/2006 | Monteverde |
| 7,281,008 B1 | 10/2007 | Lawrence et al. |
| 7,421,441 B1 | 9/2008 | Chan et al. |
| 7,739,291 B2 | 6/2010 | Broker |
| 7,756,864 B2 | 7/2010 | Chandrasekar et al. |
| 7,996,410 B2 | 8/2011 | Peng et al. |
| 8,001,457 B2 | 8/2011 | Rosenoff et al. |
| 8,150,823 B2 | 4/2012 | Hamano et al. |
| 8,239,376 B2 | 8/2012 | Fesen |
| 8,290,975 B2 | 10/2012 | Gao et al. |
| 2002/0065814 A1 | 5/2002 | Okamoto et al. |
| 2002/0073079 A1 | 6/2002 | Terheggen |
| 2002/0080179 A1* | 6/2002 | Okabe .................. G06F 3/0486 715/769 |
| 2002/0188603 A1 | 12/2002 | Baird et al. |
| 2003/0120646 A1 | 6/2003 | Littlefield et al. |
| 2004/0003096 A1 | 1/2004 | Willis |
| 2004/0095376 A1 | 5/2004 | Graham et al. |
| 2004/0143564 A1 | 7/2004 | Gross et al. |
| 2004/0260687 A1 | 12/2004 | Mano |
| 2005/0086634 A1 | 4/2005 | Bates et al. |
| 2005/0097080 A1 | 5/2005 | KethiReddy et al. |
| 2005/0149496 A1 | 7/2005 | Mukherjee et al. |
| 2005/0210042 A1 | 9/2005 | Goedken |
| 2005/0276479 A1 | 12/2005 | Goldberg et al. |
| 2006/0116994 A1 | 6/2006 | Jonker et al. |
| 2006/0122767 A1 | 6/2006 | Athalye |
| 2006/0190437 A1 | 8/2006 | Popper |
| 2006/0212441 A1 | 9/2006 | Tang et al. |
| 2006/0253586 A1 | 11/2006 | Woods |
| 2006/0277167 A1 | 12/2006 | Gross et al. |
| 2007/0032240 A1 | 2/2007 | Finnegan et al. |
| 2007/0179776 A1 | 8/2007 | Segond et al. |
| 2007/0216657 A1 | 9/2007 | Konicek |
| 2007/0233692 A1 | 10/2007 | Lisa et al. |
| 2007/0252005 A1 | 11/2007 | Konicek |
| 2007/0253643 A1 | 11/2007 | Nagarajan |
| 2008/0059419 A1 | 3/2008 | Auerbach et al. |
| 2008/0098026 A1 | 4/2008 | Kraft et al. |
| 2012/0203751 A1 | 8/2012 | Srivastava et al. |

OTHER PUBLICATIONS

Aigrain, "Organizing Image Banks for Visual Access: Model and Techniques", Optica 87, Proceedings of the International Meeting for Optical Publishing and Storage, pp. 257-270, Apr. 14-16, 1987.

Al-Hawamdeh, S. et al., "Compound Document Processing System", Proc. of the Fifteenth Annual International Computer Software and Applications Conf., pp. 640-644 Sep. 1991.

Anonymous, "Select items that aren't next to each other," Microsoft, Date Unknown.

Batley, "Visual Information Retrieval: Browsing Strategies in Pictorial Databases", vol. 1, Online 88 Information, 12th International Online Information Meeting Dec. 6-8, 1988, pp. 373-382.

Bellinaso and Hoffman, ASP.NET Website Programming: Problem—Design—Solution, Visual Basic, NET Edition, Wrox, New Ed edition; Jan. 16, 2003.

Berry and Brown, Understanding Search Engines: Mathematical Modeling and Text Retrieval (Software, Environments, Tools), Society of Industrial and Applied Mathematics, 1999.

Churbuck, "Haystack Searching", Forbes, v. 149, n. 4 Feb. 17, 1992, pp. 130 (2).

Cohen et al., "Video Disc Dictionary System", IBM Technical Disclosure Bulletin, vol. 25, No. 8, p. 4209, Jan. 1983.

Crawford et al., Crawford et al., "Toward the Development of Interfaces for Untrained Users", vol. 22, Proceedings of the Forty-eight American Society for Information Science (ASIS) Annual Meeting, 1985, pp. 236-239.

Donna Harman and Gerald Candela, "Retrieving Records from a Gigabyte of Text on a Minicomputer Using Statistical Ranking", Dec. 1990, pp. 581-589.

(56) References Cited

OTHER PUBLICATIONS

Douglas, et al., "The Ergonomics of Computer Pointing Devices," Advanced Perspectives in Applied Computing, Jun. 1, 1997.
Duchowski, Andrew, Eye Tracking Methodology: Theory and Practice, Springer, Jan. 17, 2003.
Dureau et al., "Videralp, An optical Analog Disk Planned in the Rhone Alpes Region", Optica 87, Proceedings of the International Meeting for Optical Publishing and Storage , Apr. 14-16, 1987, pp. 249-256.
Eldar Murtazin, Apr. 2001 Mobile digest: Technologies and communications Part 112 pages.
Fielden and Kuntz, Search Engines Handbook Farland & Co., Feb. 20, 2002.
Glossbrenner, Alfred, et al., Google and Other Search Engines: Visual QuickStart Guide, May 11, 2004.
Hane, Paula J., "Groxis Launches Grokker E.D.V. for the Education Market," Information Today, Dec. 20, 2004.
Hassan Alam et al., Web document manipulation for small screen devices: A review, BCL technologies Inc. pp. 33-36.
Heikki Ailisto et al., "Realising Physical selection for mobile devices", this paper was presented at Physical interaction workshop on real world users interfaces, a workshop at the mobile HCI conference Sep. 8, 2003, 5 pages.
Hill, Brad, Google Search and Rescue for Dummies, John Wiley and Sons, Ltd., Aug. 2005.
Hock, Randolph the Extreme Searcher's Guide to Web Search Engines: A Handbook for the Serious Searcher, CyberAge Books, Jul. 1, 1999.
Jennifer Fulton, "How to Use Microsoft Office XP," Copyright Jun. 2001, Using Word: Task 19 How to Insert Comments, Footnotes, etc. pp. 1-7 [in attached print out].
Joshi, Paresh Developing a Search Engine from a Database Using ASP.NET and Index Server, Apress (ISBN: B00080ATP8, May 9, 2004.
Kent, Peter, Search Engine Optimization for Dummies, John Wiley and Sons, Ltd., Apr. 2004.
Kimoto et al "A Dynamic Thesaurus and Its Application to Associated Information Retrieval" Jul. 1991 IJCNN-91-Seattle IEEE Press pp. 19-29 vol. 1.
Kimoto et al., "Automatic Indexing System for Japanese Text" 1989, Review of the Electrical Communications Laboratories, V. 37, No. 1, pp. 51-56.
Kopytoff, Verne "Hot Stories of 2004, 2005 Stories to Watch, Searching for more, Google and its rivals rolling out new ways to find information," San Francisco Chronicle, Dec. 24, 2004.
Larson, James, VoiceXML: Introduction to Developing Speech Applications, Prentice Hall, 1$^{st}$ edition, Jun. 17, 2002.
Lewis, "Planetarium on a Screen", The New York Times, Tuesday, Sep. 12, 1989.
Marshall, Matt "Groxis moves up in the world, new office, funding for Grokker Firm," Mercury News, Oct. 18, 2004.
Powell, Edwin, "Keying in on the right input device," Office Solutions, Quality Publishing, Inc., vol. 19, Issue 6,pp. 34-36, Jun. 30, 2002.
Quain, John, "Out-Googling Google," PC Magazine Jan. 14, 2004.
Russinovich and Solomon, Microsoft Windows Internals, Fourth Edition: Microsoft Windows Server(TM) 2003. Windows XP. and Windows 2000 (pro-Developer), Microsoft Press, Dec. 2004.
Ruvalcaba Zak, Build Your Own ASP.NET Website Using C# & VB.NET, SitePoint Pty Ltd., 1 edition, Mar. 1, 2004.
Salton et al., "Parallel Text Search Methods", Communications of the ACM vol. v31 Issue N2 p. 202(14), Feb. 1988.
Salton, G. et al., "The SMART Automatic Document Retrieval System—An Example", Communications of the AMC, vol. 8 No. 6, pp. 391-398 Jun. 1965.
Schroeder, Quast and Strube, Computer Speech: Recognition, Compression, Synthesis, Springer Press, Nov. 18, 2004.
Sherr, Sol, Input Devices (Computer Graphics—Technology and Applications), Academic Press, Mar. 1, 1988.
Sonnenreich and Macinta, Web Developer. com® Guide to Search Engines, John Wiley and Sons, Ltd., Feb. 4, 1998.
Sreenivas M. Kumar, Sharing of distributed data across personal digital assistants, Apr. 17, 1998, pp. 1-5.
The APS Text Search and Retrieval, classroom Manual, Planning Research Corporation, Nov. 1987, pp. 1-5 to 1-12, 2-3 to 2-32.
Tom Worthington FACS, Issues in the wireless internet”, for the art and science of computing (COMP2800/COMP3800) Apr. 2, 2001, 8 pages.
Veith, "Information Retrieval and Spatial Orientation", ASIS Proceedings 1985, pp. 250-254.
Walkenbach, John, Excel VBA Programming for Dummies, for Dummies, Aug. 20, 2004.
Wang, Wallace, Beginning Programming for Dummies for Dummies, Dec. 2003.
Select items that aren't next to each other in Word—Microsoft Word 2002 (undated).
Non-Final Office Action in U.S. Appl. No. 11/397,833, (dated Apr. 25, 2008).
Response to Non-Final Office Action in U.S. Appl. No. 11/397,833 (dated Sep. 24, 2008).
Final Office Action in U.S. Appl. No. 11/397,833, (dated Dec. 24, 2008).
Response to Final Office Action in U.S. Appl. No. 11/397,833 (dated Feb. 25, 2009).
Advisory Action in U.S. Appl. No. 11/397,833, (dated Mar. 6, 2009).
Request for Continued Examination in U.S. Appl. No. 11/397,833 (dated Apr. 23, 2009).
Non-Final Office Action in U.S. Appl. No. 11/397,833, (dsated Jul. 8, 2009).
Response to Non-Final Office Action in U.S. Appl. No. 11/397,833 (dated Jan. 8, 2010).
Final Office Action in U.S. Appl. No. 11/397,833, (dated Mar. 30, 2010).
Response to Final Office Action in U.S. Appl. No. 11/397,833 (dated Jun. 1, 2010).
Advisory Action in U.S. Appl. No. 11/397,833, (dated Jun. 28, 2010).
Appeal Brief in U.S. Appl. No. 11/397,833 (dated Nov. 5, 2010).
Examiner's Answer in U.S. Appl. No. 11/397,833, (dated Jan. 28, 2011).
Reply Brief in U.S. Appl. No. 11/397,833 (dated Mar. 18, 2011).
Non-Final Office Action in U.S. Appl. No. 13/108,705, (dated Dec. 22, 2011).
Response to Non-Final Office Action in U.S. Appl. No. 13/108,705 (dated Jun. 22, 2012).
Final Office Action in U.S. Appl. No. 13/108,705, (dated Sep. 11, 2012).
Response to Final Office Action in U.S. Appl. No. 13/108,705 (dated Jan. 11, 2013).
Non-Final Office Action in U.S. Appl. No. 13/108,705, (dated Feb. 6, 2013).
Response to Non-Final Office Action in U.S. Appl. No. 13/108,705 (dated Jul. 2, 2013).
Notice of Allowance in U.S. Appl. No. 13/108,705, (dated Sep. 3, 2013).
Request for Continued Examination in U.S. Appl. No. 11/397,833 (dated Sep. 16, 2013).
Supplemental Amendment in U.S. Appl. No. 11/397,833 (dated Sep. 19, 2013).
Non-Final Office Action in U.S. Appl. No. 11/397,833, (dated Oct. 11, 2013).
Response to Non-Final Office Action in U.S. Appl. No. 11/397,833 (dated Oct. 31, 2013).
Notice of Allowance in U.S. Appl. No. 11/397,833, (dated Dec. 30, 2013).
Notice of Allowance in U.S. Appl. No. 14/247,046, (dated Oct. 6, 2014).
Notice of Allowance in U.S. Appl. No. 14/516,477, (dated Dec. 12, 2016).
Non-Final Office Action in U.S. Appl. No. 15/409,811, (dated Jan. 11, 2018).

(56) References Cited

OTHER PUBLICATIONS

Response to Non-Final Office Action in U.S. Appl. No. 15/409,811 (dated Jul. 9, 2018).
Final Office Action in U.S. Appl. No. 15/409,811, (dated Nov. 16, 2018).
Response to Final Office Action in U.S. Appl. No. 15/409,811 (dated Dec. 6, 2018).
Interview Summary in U.S. Appl. No. 15/409,811, (dated Dec. 7, 2018).
Notice of Allowance in U.S. Appl. No. 15/409,811, (dated Dec. 13, 2018).
U.S. Appl. No. 11/397,833, filed Apr. 3, 2006, U.S. Pat. No. 8,725,729, Liu, Hexing.
U.S. Appl. No. 13/108,705, filed May 16, 2011, U.S. Pat. No. 8,631,009. Liu, Hexing.
U.S. Appl. No. 14/247,046, filed Apr. 7, 2014, U.S. Pat. No. 8,996,522, Liu, Hexing.
U.S. Appl. No. 14/516,477, filed Oct. 16, 2014, U.S. Pat. No. 9,582,580, Liu, Hexing.
U.S. Appl. No. 15/409,811, filed Jan. 19, 2017, Pending (Allowed), Wilson, Kimberly Lovel.
U.S. Pat. No. 6,785,670—Chiang et al., Aug. 2004, U.S. Appl. Nos. 11/397,833 13/108,705, Liu, Hexing.
U.S. Pub. 2008/0059419—Auerbach et al., Mar. 2008, U.S. Appl. Nos. 11/397,833 13/108,705, Liu, Hexing.
U.S. Pub. 2007/0179776—Segond et al., Aug. 2007, U.S. Appl. Nos. 11/397,833 13/108,705, Liu, Hexing.
Jennifer Fulton, "How to Use Microsoft Office XP," Copyright Jun. 2001, Using Word: Task 19 How to Insert Comments, Footnotes, etc. pp. 1-7 [in attached print out], Jun. 2001, U.S. Appl. No. 11/397,833, Liu, Hexing.
U.S. Pat. No. 6,839,702—Patel et. al, Jan. 2005, U.S. Appl. Nos. 11/397,833 13/108,705, Liu, Hexing.
U.S. Pat. No. 6,519,631—Rosenschein et al., Feb. 2003, U.S. Appl. Nos. 11/397,833 13/108,705, Liu, Hexing.
U.S. Pat. No. 5,909,678—Bergman et al., Jun. 1999, U.S. Appl. No. 11/397,833, Liu, Hexing.
U.S. Pub. 2006/0190437—Popper, C., Aug. 2006, U.S. Appl. No. 11/397,833, Liu, Hexing.
U.S. Pat. No. 5,920,854—Kirsch et al., Jul. 1999, U.S. Appl. No. 11/397,833, Liu, Hexing.
Select items that aren't next to each other in Word—MS Word 2002, Undated, U.S. Appl. No. 13/108,705, Liu, Hexing.
U.S. Pub. 2006/0116994—Jonker et al., Jun. 2006, U.S. Appl. No. 13/108,705, Liu, Hexing.
Zehnder, Tanya, "West BriefTools User Manual," Copyright 2005 West Publishing Corporation (Chapter 3—"Using BriefTools in Microsoft Word" and specifically, pp. 12-13).
"Citation Tools 2003 Brochure," Copyright 2003 LexisNexis, a division of Reed Elsevier Inc. (pp. 1, 2, 5-7).

* cited by examiner

SYSTEM, METHODS AND APPLICATIONS FOR EMBEDDED INTERNET SEARCHING AND RESULT DISPLAY

CROSS REFERENCE TO RELATED APPLICATIONS

This application is a continuation of application Ser. No. 15/409,811 (Allowed), Filed Jan. 19, 2017, which is a continuation of application Ser. No. 14/516,477 (now U.S. Pat. No. 9,582,580), Filed Oct. 16, 2014, which is a continuation of application Ser. No. 14/247,046 (now U.S. Pat. No. 8,996,522), Filed Apr. 7, 2014, which is a continuation of application Ser. No. 11/397,833 (now U.S. Pat. No. 8,725,729), filed Apr. 3, 2006, all of which are herein incorporated by reference. Reference is also made to related application Ser. No. 13/108,705 (now U.S. Pat. No. 8,631,009), filed May 16, 2011, which is also herein incorporated by reference.

BACKGROUND OF THE INVENTION

Internet searching using general search engines is a well-known process. Examples of common search engines include Google, Yahoo, AltaVista, AskJeeves, MSNSearch, HotBot, AOL Search, etc. There are also many specialized search engines that focus on particular subject matters, such as technology, sports, shopping or travel. The manner in which such search engines work is well known to those skilled in the art.

Typically, at the user level, internet searching is performed by manually entering the search terms into the search engine, either by typing the search terms or by cutting and pasting the search text into a search box on the search engine portal. The search engine then performs the search of the internet web pages and returns the results in a list form on the search engine page. These results are typically displayed in the user's web browser software. This internet search process typically requires that the search engine portal be open in a web browser and operated directly by the user. Generally, if a user wishes to conduct multiple searches on multiple search engines, each search query must be separately entered and repeated on each of the selected search engine portals. Moreover, saving the separate search results from each separate search performed on each separate search engine generally requires cutting and pasting of displayed results into a file, or otherwise saving off-line each of the search engine's resultant webpage(s), etc.

Recently, commercial search engine portals, such as Web-Crawler, Yahoo and Google, have developed "toolbars" that may be installed as a plug in for web browsers. These toolbars enable users to enter the search terms in the search box in the toolbar, instead of having to go to the actual search engine portal directly. Typically, when a search is conducted using a toolbar, the user enters the search text into the search box of the toolbar and commands a search to be performed, at which time the browser is redirected to the search portal and the results displayed in the browser or in a separate window generated by the browser.

Search engines also exist that route a specific search query to each of a multiple number of other search engines, returning the results in a compiled manner, eliminating duplicates. Thus, the user does not need to separately enter the queries on each search engine. For example, Web-Crawler and Dogpile are well-known search engines that forward individually entered queries to multiple other search engines (such as Google, Yahoo, MSNSearch, etc,), and compile and return non-duplicative results to the user for display in the browser. These type of engines are commonly referred to as "meta-search engines." Such meta-search engines typically do not own a database of web pages, but instead, send search terms to the databases maintained by search engine companies. Thus, unlike search engines, metacrawlers do not crawl the web themselves to build listings. Instead, they allow searches to be sent to several search engines all at once. The results are then blended together onto one display page. However, the user must still manually enter each individual query term, and may only perform one query at a time, and the results must be individually saved.

For a more detailed review of using internet search engines, and their operation, see the following books or articles, each of which is incorporated herein by reference: (1) *Google Search and Rescue for Dummies*, by Brad Hill, John Wiley and Sons, Ltd. (August, 2005); (2) *Search Engine Optimization for Dummies*, by Peter Kent, John Wiley and Sons, Ltd. (April 2004); (3) *Understanding Search Engines: Mathematical Modeling and Text Retrieval (Software, Environments, Tools)*, by Berry and Brown, Society of Industrial and Applied Mathematics (1999); (4) *Google and Other Search Engines: Visual QuickStart Guide*, by Alfred Glossbrenner, et al. (May 11, 2004); (5) *Web Developer.com(r) Guide to Search Engines*, by Sonnenreich and Macinta, John Wiley and Sons, Ltd. (Feb. 4, 1998); (6) *Developing a Search Engine from a Database Using ASP-.NET and Index Server*, by Paresh Joshi, Apress (ISBN: B00080ATP8, May 9, 2004); (7) *The Extreme Searcher's Guide to Web Search Engines: A Handbook for the Serious Searcher*, by Randolph Hock, CyberAge Books (Jul. 1, 1999); (8) *Search Engines Handbook*, by Fielden and Kuntz, Farland & Co (Feb. 20, 2002); and (9) "Hot Stories of 2004, 2005 Stories to Watch, Searching for more, Google and its rivals rolling out new ways to find information," by Verne Kopytoff, San Francisco Chronicle (Dec. 24, 2004).

Another form of commercially available meta-search engine, referred to by the trademark "Grokker," purports to differentiate itself from mainstream search engines such as Google, Yahoo and AskJeeves by helping users to dig deeper in their searches. Grokker relies on search engines to do the crawling, but lists the results differently: according to subject, so that, for example, a search for Paris gives the user a single page with several categories titled "history," "museums," "universities," "hotels" and so on. The results are presented on the Web page in the shape of a sphere, and the user "drills" down within multiple layers of the sphere to refine the search to exactly what they he or she needs. Each object is labeled according to organizing principles, including date and context, so the user gets what amounts to a visual relational database that includes Web pages, documents, and pictures. The search results are not just put in files and folders, but are organized by using color, shape, size, position, and order.

Grokker purports to operate in four layers: (1) The Data Collection Layer: after the user enters a query, Grokker's data collection layer retrieves the query results from all selected sources. Grokker relies primarily on non-disruptive xml data feeds to retrieve results; (2) The Content Analytics Layer: once results are retrieved, Grokker analyzes metadata, document contents, and other information to organize results into categories; (3) The Data Filtering Layer: Grokker also normalizes data from disparate sources with uniform attribute tagging so that the end user can understand the relationships among results and more efficiently explore and understand returned links and documents; and (4) The Visualization API: The visualization API displays the normalized, topically organized results in easy to navigate visual formats that allow viewers to explore large sets of results, filter results to pinpoint essential data, and leverage the results to create new knowledge, research and products. See "Groxis moves up in the world, new office, funding for Grokker Firm," by Matt Marshall, *Mercury News* (Oct. 18, 2004); "Out-Googling Google," by John Quain, *PC Magazine* (Jan. 14, 2004); "Groxis Launches Grokker E.D.U. For the Education Market," by Paula J. Hane, *Information Today* (Dec. 20, 2004); each of which is incorporated herein by reference.

"Pull down," "pop down," or "drop down" menus (hereinafter collectively referred to as "pull down" or "display" menus) used in text or graphics generating or reading programs are well known. In general, such display menus give the user a list of specific items to choose from, tasks to perform, or preferences to be selected. These items are typically referred to as "menu options," and generally are associated with a broader function button or with a specific item contained within the window's toolbars. For instance, at the top of a display window, there are usually the words "file," "edit," "view," "tools," etc. Clicking on any of these words typically results in a pull-down menu providing more precise capabilities or available operations under this heading that the user may then select. Often, these actions result in series of "nested" pull-down menus.

Similarly, in a typical word processing program, if one highlights a word of text and right clicks the highlighted word, a menu typically pops up giving the user several operations that he or she may then select, such as "cut," "paste," "copy," "spell checking," "translate," "synonyms," "font," "formatting," etc. Pull-down menus typically hide the options until the user needs them. Once a menu has been invoked, the user then moves the mouse pointer over the list to an item to make his or her menu choice and clicks his mouse button on the menu item. Alternatively, the user can simply move the mouse pointer to an area other than the menu, and clicks to abort the menu. Sometimes the user's choice is selected as soon as he or she clicks on it. For representative design information on menu creation and use in a computer graphical interface, see U.S. Pat. Nos. 6,957,396, 6,956,593 and 6,918,091, each of which is incorporated herein by reference.

Cursor hovering to invoke helpful information in displays is also well known. For example, hovering the cursor over an HTML link on a webpage will many times cause an information window to open giving some detail or information about the link. Hovering the cursor over one of the many icons on the desktop may invoke the display of an information window describing something about the icon's functionality or purpose. Many of the operation buttons (typically on the toolbars) of many popular windows programs will display an information box if the cursor is allowed to hover over one of them. For more detailed information on creating link hovers, see U.S. Pat. Nos. 6,938,221, 6,834,372 and 6,828,988, incorporated herein by reference. For more detailed information on building websites, programming and creating text, graphics and menus, see the following, each of which is incorporated herein by reference: *Beginning Programming for Dummies*, Wallace Wang, For Dummies (December 2003); *Build Your Own ASP.NET Website Using C# & VB.NET*, by Zak Ruvalcaba, SitePoint Pty Ltd., 1 edition (Mar. 1, 2004); *ASP.NET Website Programming: Problem—Design—Solution, Visual Basic .NET Edition*, by Bellinaso and Hoffman, Wrox, New Ed edition (Jan. 16, 2003); *Excel VBA Programming For Dummies*, by John Walkenbach, For Dummies (Aug. 20, 2004); *Microsoft Windows Internals, Fourth Edition: Microsoft Windows Server™ 2003, Windows XP, and Windows 2000 (Pro-Developer)*, by Russinovich and Solomon, Microsoft Press (December 2004).

It is also known to provide increased user interface capabilities with alternative input devices such as touchpads, joysticks, a roller mouse and touch sensitive screens, for example. Each of these existing devices or methods may include multiple programmable input methods, such as right and/or left click buttons, or touchscreens or pads, that are used by the operator to highlight and select text, initiate functions, pull down menus, etc. For touchpads, joysticks, etc. (incorporating gesture recognition features), the number of times a menu or word is "tapped" can initiate different operations (for example, by acting in a manner similar to mouse clicks). For more detailed information on programming and using input devices, see the following, each of which is incorporated herein by reference: *Input Devices (Computer Graphics—Technology and Applications)*, by Sol Sherr, Academic Press (Mar. 1, 1988); "Keying in on the right input device," by Edwin Powell, *Office Solutions*, Quality Publishing, Inc., Volume 19, Issue 6, Pages 34-36 (Jun. 30, 2002); "The Ergonomics of Computer Pointing Devices," by Douglas et al, *Advanced Perspectives in Applied Computing* (Jun. 1, 1997); and U.S. Pat. Nos. 6,927,758, 6,892,597, 6,798,397, 6,781,570, 6,756,965, 6,740,863, 6,646,632 and 6,507,338.

It is further known to use speech recognition as an input device to computers. For more details on speech recognition use in computers, see the following references, incorporated herein by reference: *Computer Speech: Recognition, Compression, Synthesis*, Schroeder, Quast and Strube, Springer Press (Nov. 18, 2004); *VoiceXML: Introduction to Developing Speech Applications*, by James Larson, Prentice Hall, 1st edition (Jun. 17, 2002); and U.S. Pat. Nos. 6,985,865, 6,993,486 and 6,990,445. Gaze tracking has also been used as an input device. For more detailed information on using computer eye tracking devices, see the following references, incorporated herein by reference: *Eye Tracking Methodology: Theory and Practice*, by Andrew Duchowski, Springer (Jan. 17, 2003); and U.S. Pat. Nos. 6,943,754, 6,886,137 and 6,758,563.

Recently, software programs have been developed that query leading search engines to identify and list search results. For example, one commercially available program trademarked under the name "Copernic Agent" offers a user interface and search toolbar that allow the user to employ several search enhancement features, purportedly making internet searches faster and easier than with standard search engine interfaces. Copernic Agent purports to give the user better search engine results by consulting multiple search engines at once, combining results, removing duplicates, removing broken links, allowing the user to search within results, save result pages on the user's computer for offline browsing, sort results, e-mail results to colleagues, and generate search reports. The toolbar feature may be integrated to Internet Explorer or Microsoft Office, and allows the user to employ Copernic Agent to begin a search directly from the user's web browser or word processor by right-clicking on a word or highlighted phrase to start a search on it. The search the user starts with this toolbar is synchronized and replicated in, and results reported in a Copernic Agent window (which is typically the window in from which the search was invoked). Additional enhancements purport to allow the user to highlight and seek keywords within browsed pages, navigate within results, retain search history, annotate results, delete selected results and filter results. See Copernic Agent Specifications sheet, included as Table 1 at the end of the specification, below. See also U.S. Pat. No. 6,810,395, incorporated herein by reference.

However, no existing internet search engine or toolbar allows a user who is reading, writing or otherwise viewing a document (such as a wordprocessing document or web site article) to highlight or otherwise group multiple selected key words to be searched at any number of selected search engines. Rather, for all known search engines, the queries must be individually entered and searched. This is particularly cumbersome even on a full keyboard and with a large computer screen. For small handheld computers, pda's or cellphones, such extensive text entry is tedious and nearly impossible.

Additionally, known methods of displaying results of searches typically require that the results be displayed in a wholly separate window, thereby necessitating the user to constantly change which window is in the foreground for review. Furthermore, there is no automatic method of including the returned results within a document or window that the user is composing or reviewing. Again, typically the user must cut and paste the results into the document if so desired. Another problem in the prior art is that when one has selected a phrase to search, all of the words of the phrase will be searched. It is not believed that any program has the ability to have the search performed on only the important or keywords of the phrase and automatically eliminating common words (such as "and," "a," "the," "of," etc.).

The need exists for an improved internet search capability that allows users who are typing, reading or otherwise viewing documents or windows to easily select, identify and group disparate words, text or graphics into logical connected search queries, which are then automatically routed to any number of selected search engines. The need also exists for an internet search capability that allows the user to select the manner in which the results are displayed or incorporated in the document that the user is reading or writing, and from which the search was generated.

SUMMARY OF THE INVENTION

It is an object of the invention to provide an improved, easily configurable and robust internet searching tool.

It is another object of the invention to provide an improved graphical user interface for enhanced and robust internet searching.

It is another object of the invention to provide an improved internet searching tool that allows multiple search queries to be easily generated from pre-existing written text, such as internet pages, word processing documents, spreadsheets, emails, etc.

It is another object of the invention to provide a search engine that allows internet searching to be done on graphics, such as pictures, images or figures, or on sounds.

It is another object of the invention to allow for relevancy management of a multi-word search queries by either manually selecting proximity parameters, or allowing proximity to be automatically determined based on the actual proximity of the search terms used to make up the search phrase as appearing within the underlying document.

It is another object of the invention to allow a user to highlight a phrase of connected words to generate the basis for an internet search phrase, and then to eliminate unwanted words from the highlighted phrase by common input devices, such as by returning to the highlighted phrase and left, right or double clicking on the unwanted words within the highlighted phrase.

It is another object of the invention to provide an internet search tool that allows search queries to be generated by highlighting existing text or graphics in a document or web page, rather than by typing in queries.

It is another object of the invention to provide an enhanced internet searching tool that allows devices with limited screen sizes and/or keyboard sizse to perform robust searches, with minimal typewritten text entry.

It is another object of the invention to provide an improved internet searching tool that allows results to be displayed, reviewed, edited or easily embedded or incorporated into existing documents.

It is another object of the invention to provide an improved internet search menu, toolbar or window that can be installed as a plug in on any text or graphics reading or generating program, such as word processors (Word, Wordperfect, Write, etc.), presentation (PowerPoint, etc.), email (Outlook, Outlook Express, Eudora, etc.), or web browser (Firefox, Mozilla, Netscape Navigator, Internet Explorer, etc.).

It is another object of the invention to provide an improved internet searching tool that allows all or part of the content of the web pages found as a result of the search to be selectively embedded into the existing documents.

It is another object of the invention to provide an improved internet searching tool that automatically generates footnotes or endnotes in written documents, wherein the footnotes or endnotes are based upon selected search results and are keyed to the search terms within the document responsible for generating the search.

It is another object of the invention to provide an improved internet searching tool that gives the user greater control over what is displayed as a result of the search.

It is another object of the invention to allow a user to select a phrase in a text document, and then perform an internet search that automatically excludes the common or non-substantive words found in the phrase.

It is another object of the invention to provide an improved internet searching tool that allows the user to select any of a number of search engines to perform the search, and to select the number of results to be displayed from each engine.

It is another object of the invention to provide an improved internet searching tool that allows the user to select how much text from each result is to be displayed.

It is another object of the invention to provide an improved internet searching tool that automatically performs a spell checking operation on a search phrase, before conducting the search.

It is another object of the invention to allow text from internet search results to be copied or pasted into a document in the document's default or other selected format, not in the format of the web page.

It is another object of the invention to provide an improved internet searching tool that allows a user to select how much web page content of each search result to download and either embed or store off line for later review.

It is another object of the invention to provide an improved internet or web based searching tool that allows robust searches to be generated and saved on devices with limited keyboard input, such as on pda's, cell phones, organizers, etc.

The above and other objects are achieved by systems and methods that generate an internet search phrase and conduct an internet search from within an existing document. In a first form, the systems and methods comprise selecting from within the document distinct first and second search terms.

Depending on the specific form of the invention, the search terms may be selected by highlighting the term with any of a variety of available manual computer input devices. Alternative forms of input devices include a keyboard, mouse, touchpad, touch sensitive screen, eye gaze tracker, and speech recognition device, etc. The first and second search terms are routed to an internet searching program (e.g., a search portal) in the form of a first defined search phrase. The internet searching program can take a variety of forms, including the standard search portal, search tool bar embedded in the program displaying the document, or a stand alone program such as Copernic Agent. The search phrase is employed to conduct a search on the internet. The results of the internet search are returned to the original document in a form that is linked to the first and second search terms of the document.

Depending on the specific form of the invention, the results may be returned to the document in many possible alternatives that are linked to the first and second search terms. For example, the results may be returned as footnotes, endnotes, hover notes, pull down menus or windows, or comment notes linked to each of the search terms. Still further, a variety of different types of search terms may be used, including words, graphics, pictures, images, numbers or text. The search terms may be selected from any variety of document types, including word processing documents, spreadsheets, emails, presentations, internet pages, etc. In a further modified form of the invention, the number of words separating the selected search terms is applied as a proximity limiter in the internet search. For example, if the search terms are separated by 20 words in the document, then the internet search will return only those results containing the search terms within the same separation limit of 20 words.

The systems and methods further allow the user to select the type and amount of information displayed, embedded, returned etc. as a result of the search. For example, the search results may be returned in the form of data defining the address of internet web sites found as a result of the internet search (e.g., as a URL), or alternatively, the user may select the number of individual web sites to return as a result of the search. Still further, returning the search results to the text document can include automatically generating a summary or abstract, or returning a selected amount of the text (e.g., 50 words) of the found internet web sites.

The above and other objects are also achieved by systems and methods that generate an internet search phrase and conduct an internet search from within an existing document. The systems and methods allow the user to select from within the document one or more search terms to form a first search phrase, and selecting one or more search terms to generate a second search phrase. Preferably, the first and second search phrases are different. However, one or more words in each search phrase may be the same. Additional search phrases may also be selected. The multiple search phrases may be individually, or together, routed to an to an internet searching program. If desired, the search phrases can be routed to the same or different search engines, or to multiple search engines. The selected internet search engine(s) conduct(s) the internet search for each search phrase, and return(s) the results to the document in a format linked to the respective search phrase(s) that generated the results.

In accordance with the invention, the search phrases can each comprise one term, or multiple terms. In a modified form of the invention, the different search phrases, and the terms that make them up, can be highlighted in different colors. The respective search results can be returned to the document linked to the corresponding search terms with the same colors. The user may elect to have the search terms or phrases spell-checked before they are routed to the search engines. The user may also select the number of results to return for each search, and further, may elect to return either a selected amount of the text of each result, or a summary of each result. The results may be returned to the document in the same format as the contents of the document, and may thereafter be edited or used to launch a web browser to view the corresponding web site. Alternatively, superscripts may be used to link the search terms to the search results, which appear as correspondingly numbered footnotes or endnotes. It is contemplated that the results returned by the search engine or program may be modified or further refined before returned or displayed in the document which formed the basis for the search.

The above and other objects are achieved by methods that generate an internet search phrase and conduct an internet search from within a document, comprising selecting from within an existing document a group of connected substantive and non-substantive words to form an initial search phrase and then applying a filtering procedure to eliminate the non-substantive words from the initial search phrase. This results in a refined first search phrase comprising only the remaining substantive search terms from the originally highlighted phrase. The refined first search phrase is then routed to an internet searching program, which conducts a search of internet web pages and returns the results to the document in a format linked to the refined search phrase, as discussed above.

The preferred embodiments of the invention presented here are described below in the drawings and detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning.

Likewise, the use of the words "function" or "means" in the Specification or Description of the Drawings is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for," and will clearly recite a function, without also reciting in such phrases any structure, material or act in support of the function. Even when the claims recite a "means for" or "step for" performing a defined function, if the claims also recite any structure, material or acts in support of that means or step, or that perform the function, then the intention is not to invoke the provisions of 35 U.S.C. 112, Paragraph 6. Moreover, even if the provisions of 35 U.S.C. 112, Paragraph 6 are invoked to define the claimed inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

DESCRIPTION OF THE PREFERRED EMBODIMENTS

The present invention provides the capability to easily conduct various internet searches using words or phrases from an existing document as query terms, and then return the results for use in the same document. It is contemplated that, when installed, the present invention will include any of a new toolbar, tool bar buttons, information pop up or drop down menus, etc., that will be accessible from the window toolbar or sidebar areas, or by right or left mouse clicks where appropriate, (e.g., on selected words or phrases, menu items invoking sub-menus, etc). The invention is particularly applicable when robust searches are required, or when the computing device has cumbersome or limited keyboard or input device (such as a pda, cell phone, tablet pc, etc.).

The invention is best understood by explanation of its operation from within a familiar framework, such as composing a document that exists in Microsoft Word. However, as will by understood by those skilled in the art, the invention is applicable to any of the various document composing or reviewing programs such as Microsoft Word, Open Office Write, Adobe Acrobat, Outlook, Wordperfect, Eudura, Outlook Express, etc., in any of the various configuration of such software, (e.g., desktop version, mobile version, table PC version, etc.) and regardless of the underlying code used to develop such software, (e.g., C, C++, Visual BASIC, JAVA, etc.).

Figure 1:
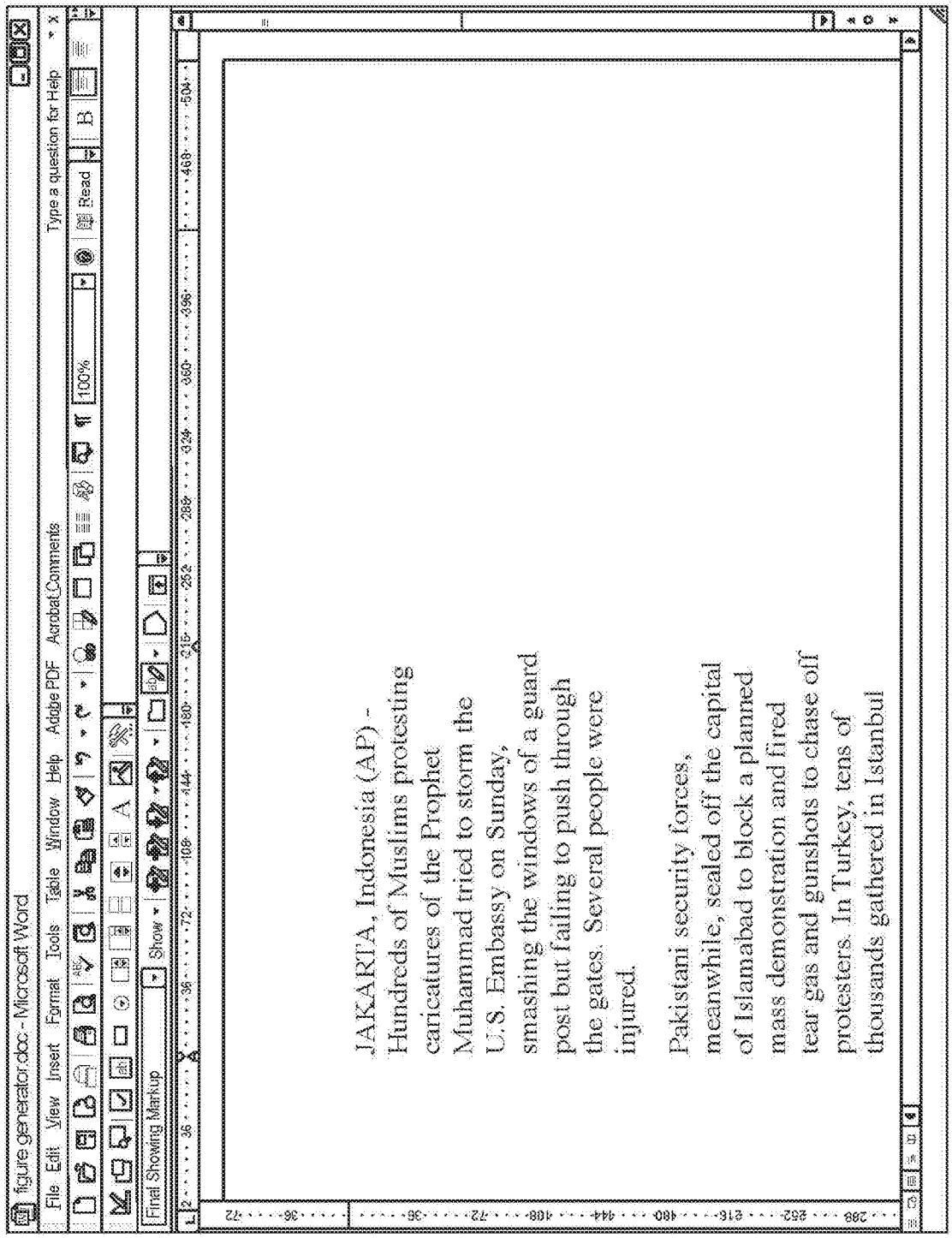
FIG. 1 depicts a typical word processor window having a document with text within its body.

In one form of the invention, a user is viewing a word processing document on a given topic. For example, see FIG. 1, which depicts a representative word processing "window" which will serve as a model for a description of various features and operations of the invention. In this case, the program is Microsoft Word. However, the window shown in FIG. 1 may just as easily be the window in a presentation program, or in a web browser. As is typical in the art, there is an area at the top of the screen that includes both "word" menus and icon menus. By clicking on the menus or icons, other nested menus are initiated, allowing the user to select various operations useful to any number of given tasks.

Figure 2:
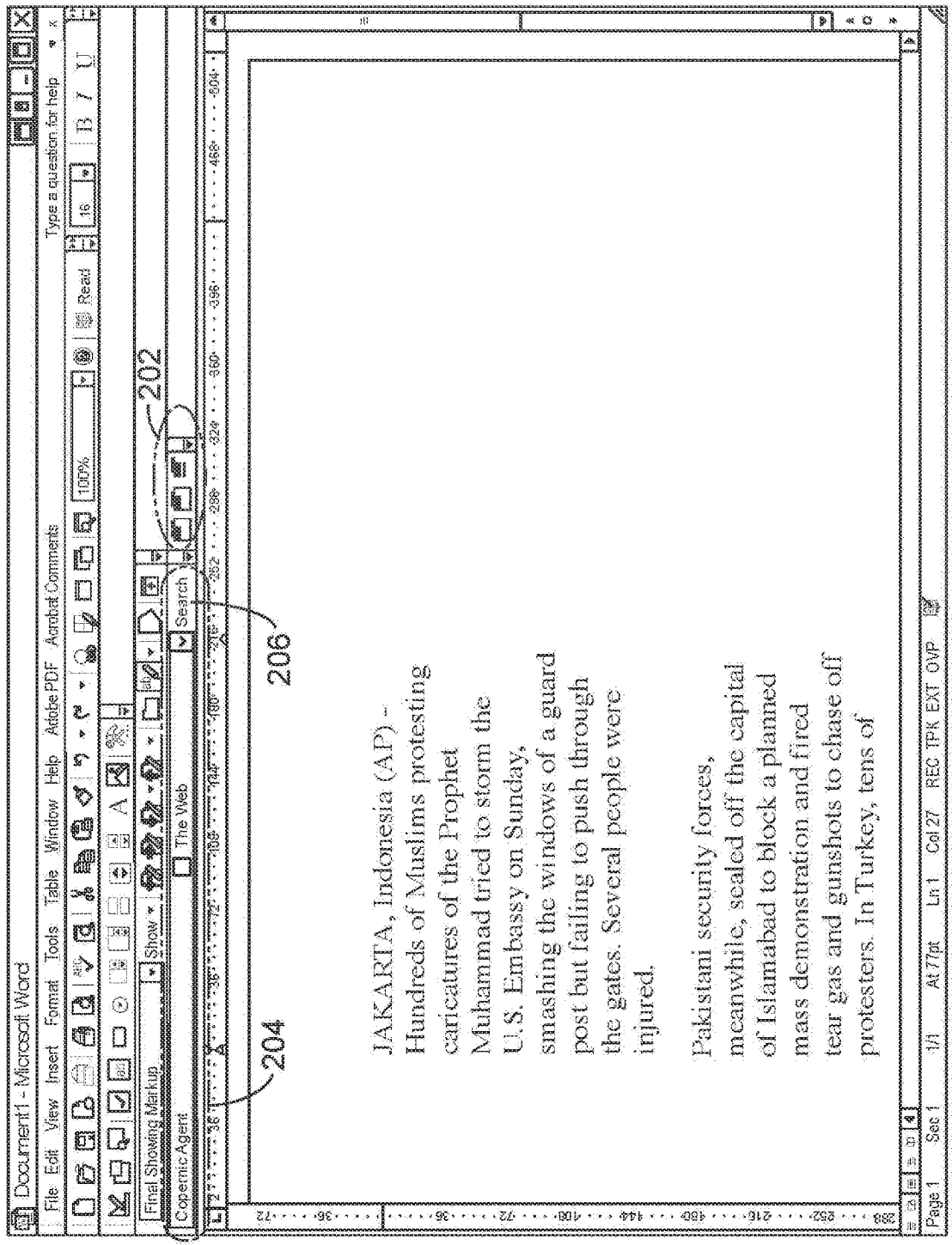
FIG. 2 depicts a user interface of word processor of FIG. 1 with additional search tool bars and buttons.

Referring to FIG. 2, an additional toolbar 204 is shown, known under the common name "Copernic Agent Toolbar." Also shown is a second tool bar numbered 202, associated with Adobe Acrobat. The Copernic Agent toolbar 204 allows the user to type in search terms, and click the SEARCH button 206 to initiate a corresponding search on the internet. Once the SEARCH button 206 is clicked, the actual Copernic Agent program is launched in a separate window (not shown), at which point the internet search is separately initiated and conducted, and the results indicated in the separate window (not shown).

Figure 2A:
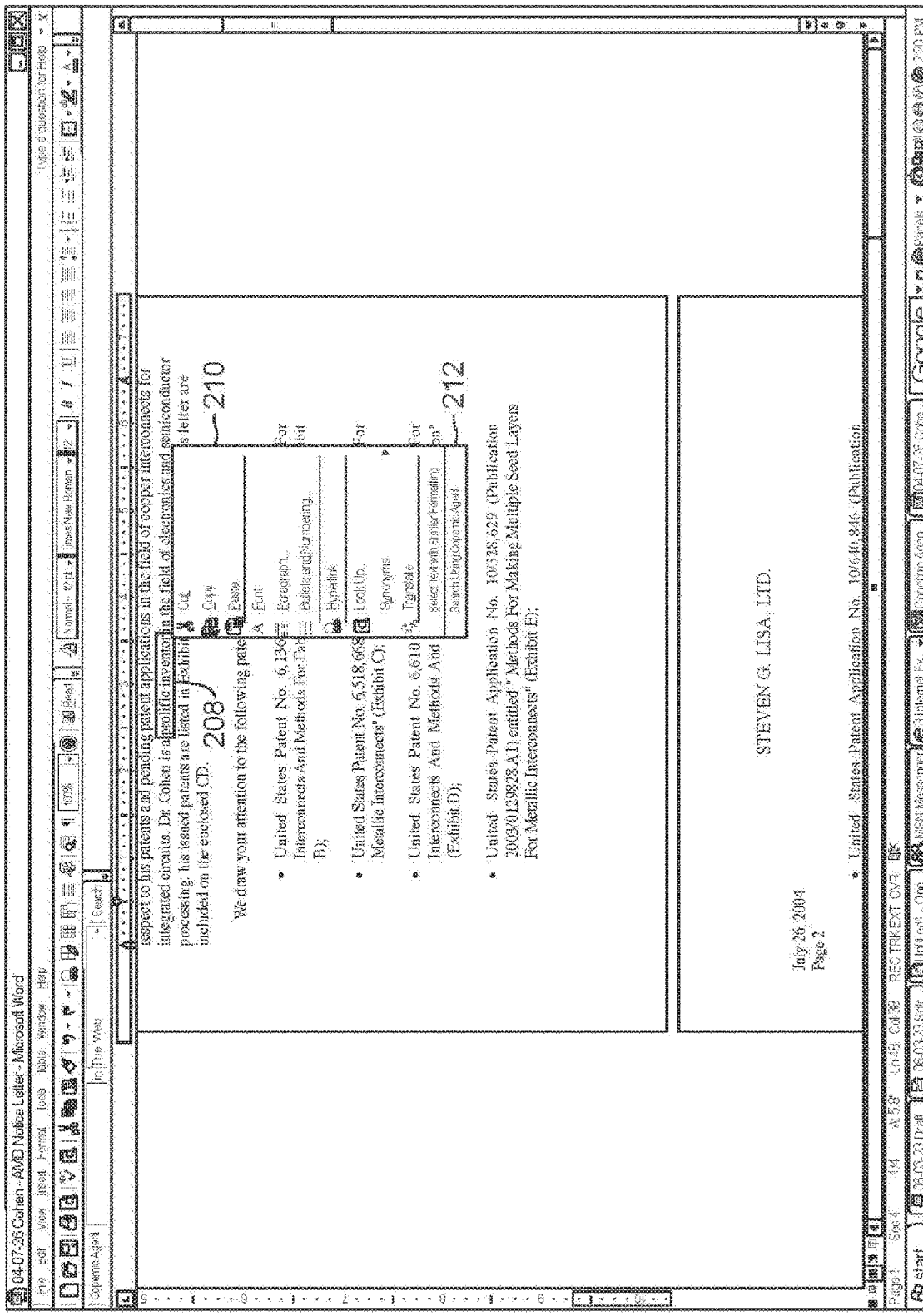
FIG. 2A depicts the user interface of word processor of FIG. 2 with additional search tool bars and buttons installed in accordance with the search program known under the trademark "Copernic Agent."

Alternatively, and referring to FIG. 2A, the user may highlight multiple consecutive words 208 in the text file and right click on the highlighted words to launch a menu 210 that appears with an operation entitled "Search Using Copernic Agent" 212 at the bottom. If the user initiates this SEARCH operation, the user is again taken to the separate window where the Copernic Agent program has launched, and at which point Copernic Agent operates in its normal manner.

While this known form of a search "toolbar" is a useful searching tool, it highlights several of the problems with existing search methods. For example, using the Copernic Agent toolbar, only one or more connected words may be searched, the user must actually initiate and review the search results in the separately launched Copernic Agent window, only one search can be run at a time, and the results returned to the existing word processing program.

Figure 2B:
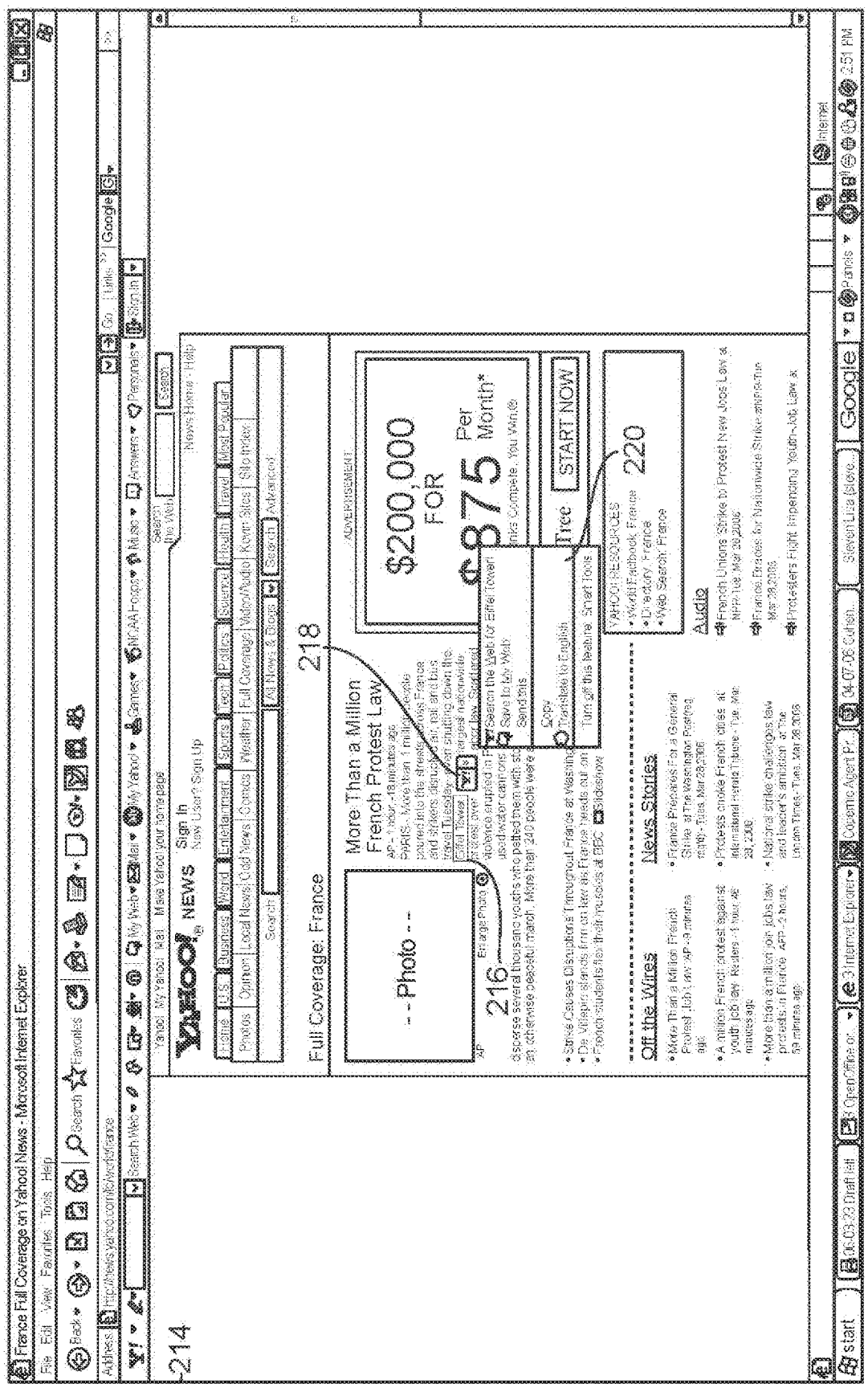
FIG. 2B depicts a user interface for a typical internet search browser such as Microsoft Internet Explorer, with search tool bars and buttons installed in accordance with the search program known under the trademark "Yahoo Toolbar."
Figure 2C:
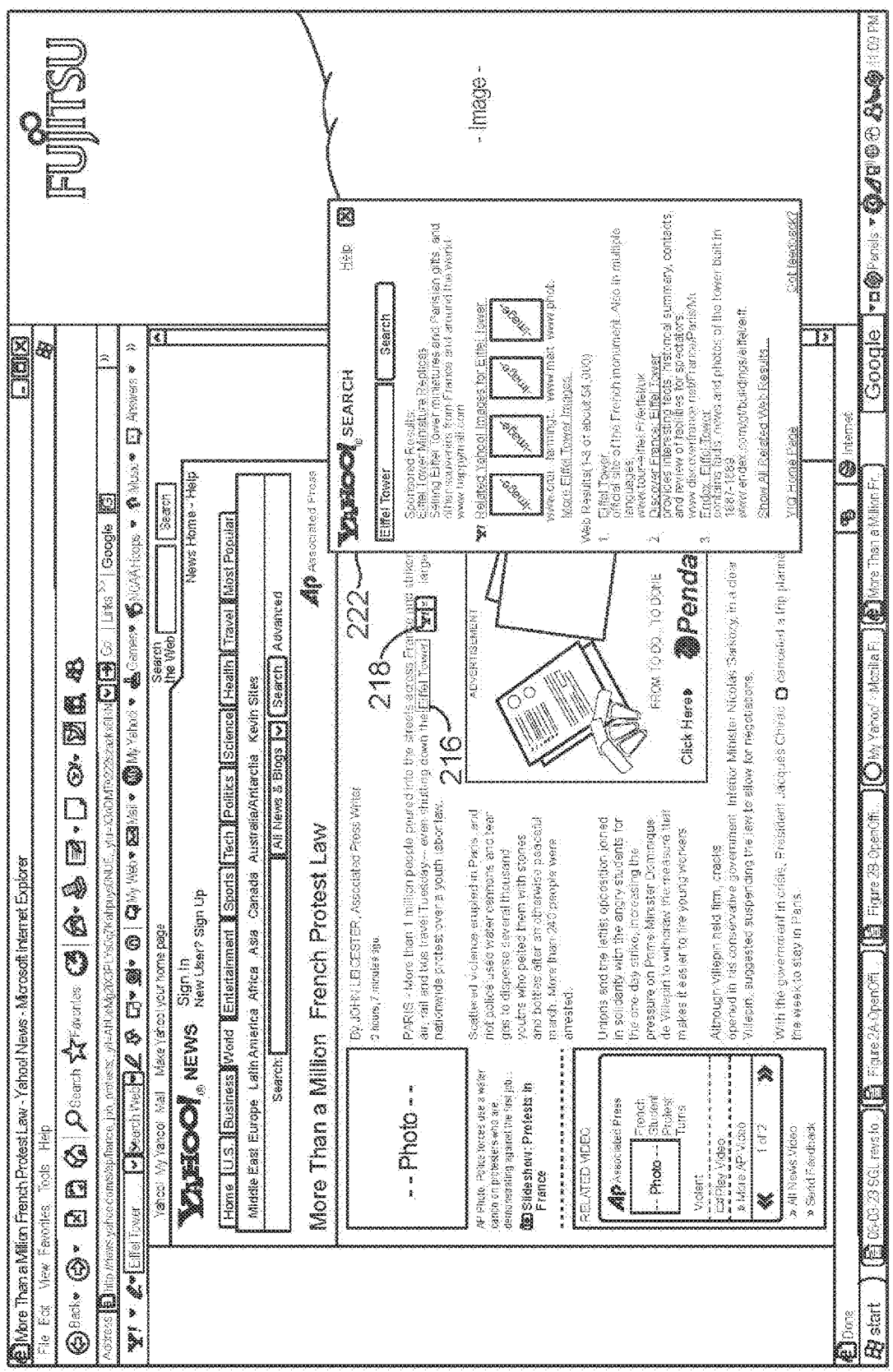
FIG. 2C depicts the return of search results to a user of a typical internet search browser such as Microsoft Internet Explorer, after a search was initiated using search tool bars and buttons installed in accordance with the search program known under the trademark "Yahoo Toolbar."

Referring now to FIG. 2B, another search toolbar 214, known under the trademark "Yahoo Toolbar" is shown embedded in Microsoft's Internet Explorer. A Yahoo news page is also shown in the window of FIG. 2B, with an article on a recent labor protest in France. Using the Yahoo Toolbar 214, the user may again highlight words such as "Eiffel Tower," as shown at 216 in FIG. 2B. A short delay after completing highlighting of the terms 216, a small Yahoo symbol 218 appears next to the highlighted terms 216. By clicking on the small Yahoo symbol 218, a nested search menu 220 appears, with several search options. One of the options is "Search the Web for 'Eiffel Tower'". By moving the cursor over this menu item and clicking a separate Yahoo SEARCH results window 222 will appear, as shown in FIG. 2C.

Figure 2D:
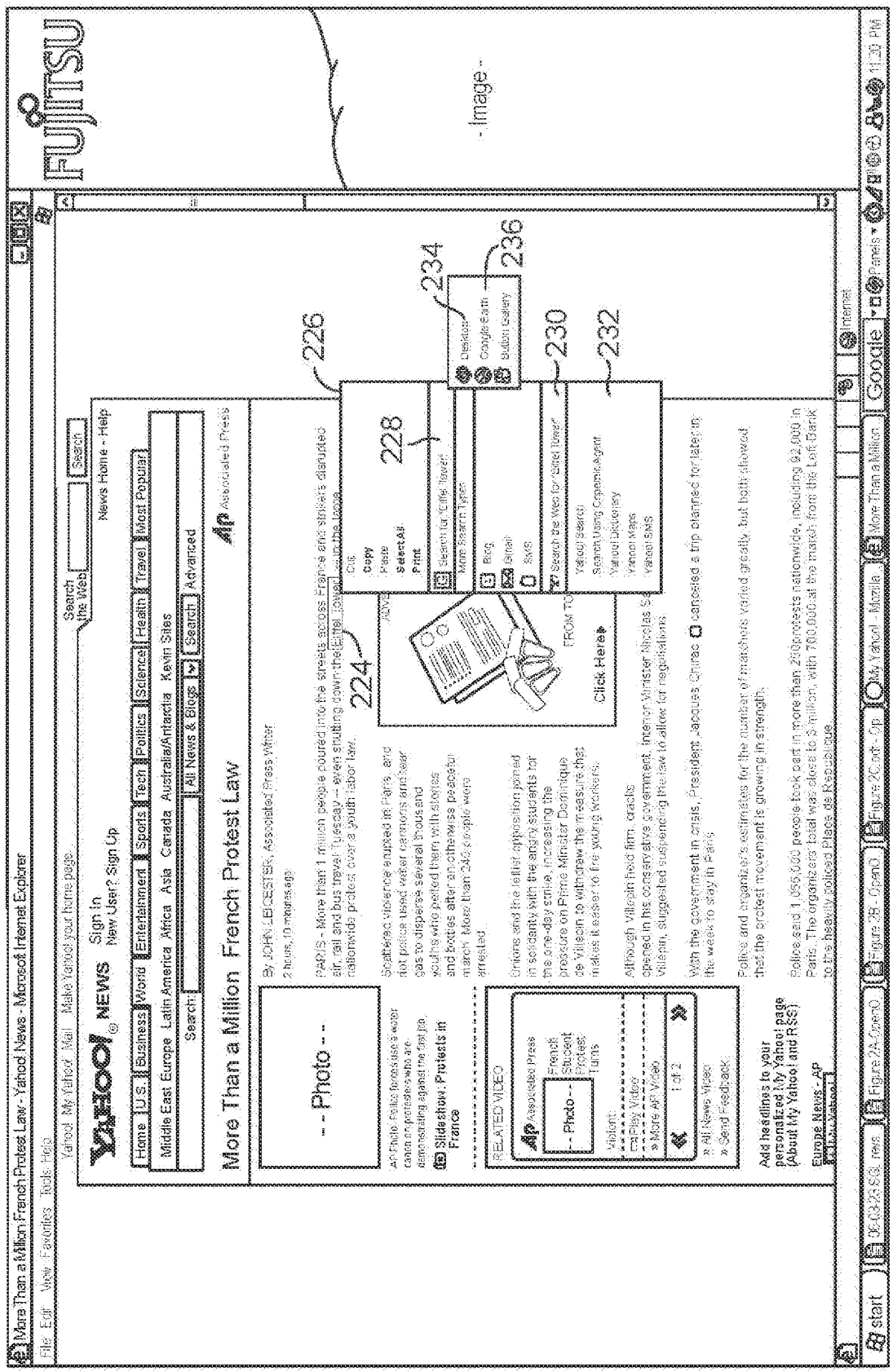
FIG. 2D depicts a user interface for a typical internet search browser such as Microsoft Internet Explorer, with search tool bars and buttons installed in accordance with the search program known under the trademark "Yahoo Toolbar," "Google Toolbar" and "Copernic Agent."

Referring now to FIG. 2D, Microsoft's Internet Explorer is shown with a Yahoo news story on a labor protest in France. The computer has been installed with the Yahoo Toolbar, Copernic Agent, and the well known Google Toolbar. Even though none of the menus for the programs are made visible, when the words "Eiffel Tower" are highlighted at 224, the user may right click on the highlighted terms, causing another nested menu 226 to appear. From this menu 226, the user may select to search the web for the highlighted terms "Eiffel Tower" using either the Google Search line 228, the Yahoo Search line 230, or Copernic Agent Search line item 232. Various other operations may also be selected, including searching the computer desktop 234 or Google Earth 236.

Again, while these known forms of embedded search "toolbars" are useful searching tools, they still further highlight the problems with existing search methods. For example, using the Yahoo Search toolbar, only one or more connected words may be searched, the search can only be done using Yahoo's portal, only one search can be run at a time, and the results cannot be embedded into the existing word processing program. When the Google search operation 228 is selected, the user is no longer able to view the news story he or she was viewing at the time the search was generated, as the Google search operation returns the results in the current window. Additionally, the Google Search toolbar has many of the same disadvantages of the Yahoo Toolbar methods, described above.

Figure 3:
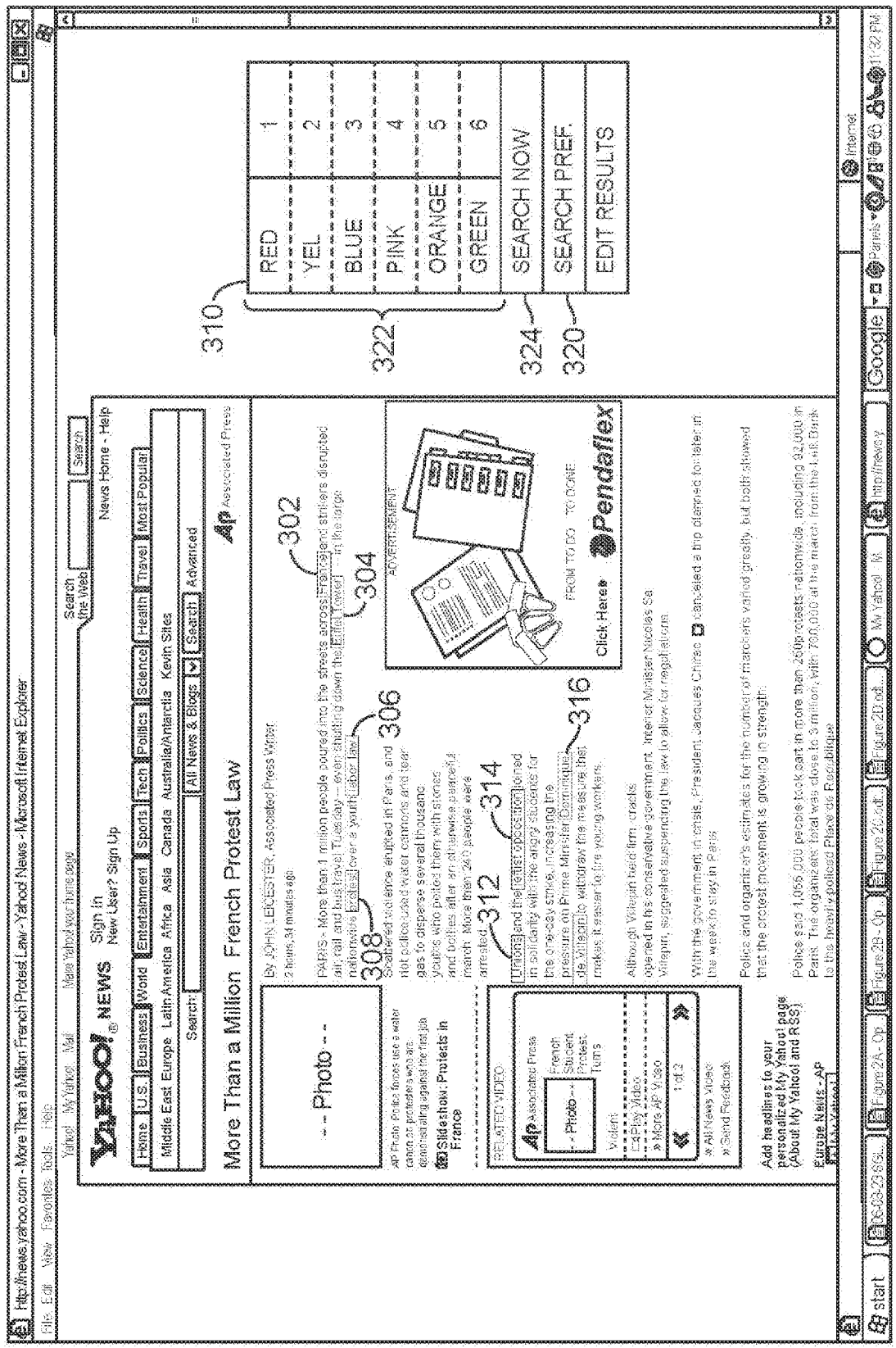
FIG. 3 depicts highlighting of search words within the document text, and assignment of search phrase categories via a popup menu, in accordance with one form of the present invention.

Referring now to FIG. 3, the advantages of the present invention become apparent. To conduct a search, the user can highlight a single word, or a number of separate words or phrase(s) in the document by the familiar method of double left clicking the word or by clicking and holding the mouse button while he drags the cursor to highlight the word or phrase. Of course, any equivalent form of highlighting can be used, such as using a touchscreen, eye gaze tracking, speech recognition (such as that employed in common speech recognition programs allowing voice control of word processing programs, such as, for example, that sold under the trademark "Dragon Naturally Speaking") or any other applicable text highlighting system or method. In particular, it is contemplated that any and all forms of computer input devices may be used, such as, for example, those described in the references incorporated in the Background of the Invention.

For example, assume the user wishes to conduct a more narrow search using the the following spaced apart terms found in the article: "France" 302, "Eiffel Tower" 304, "protest" 306 and "labor law" 308. In other words, the user wishes to search the web using the search phrase "France Eiffel Tower protest labor law." None of the current toolbars will allow the user to select each of these terms and conduct a search. However, in accordance with the present invention, the user may select each of the terms or individual phrases, click or delay over the terms or phrases, or move the cursor to operate a menu or icon in a toolbar located at the top of the screen. Doing any of the above, or by using equivalent highlighting and menu selection operations, the user may initiate a SEARCH menu 310. The user may then select a search grouping for each term.

Figure 9:
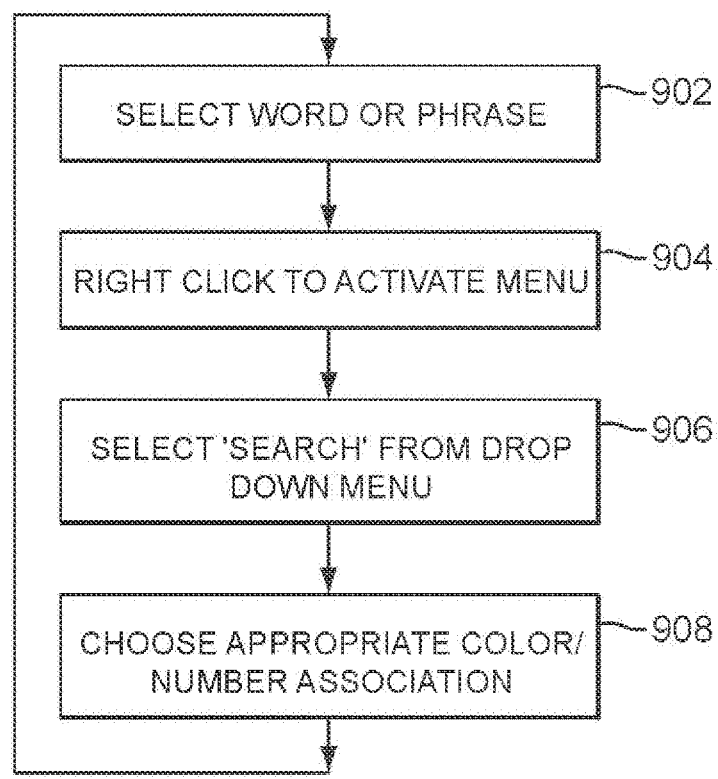
FIG. 9 shows a method for indicating search terms according to the various aspects of the invention.

Referring to FIG. 9, an exemplary method for indicating search terms according to the various aspects of the invention is described. At act 902, a word or phrase is selected. At act 904, a 'right click' activates a menu. At act 906, a 'search' function is selected from a menu. Act 908 is "choose appropriate color/number association."

In this example, and in accordance with one form of the invention, the user highlights and clicks on the term "France" 302, calls up the SEARCH menu 310, and assigns ranking "1" or alternatively the color red to that term. At that point, the term France 302 would either be highlighted red or change to a light red text color or hue. Next, the user would highlight the phrase "Eiffel Tower" 304, call up the SEARCH menu 310, and assign ranking "1" or alternatively the color red to that phrase. At that point, the phrase "Eiffel Tower" 304 would also change to a light red (but still transparent) color or hue, thus visually indicating that it is in the same search phrase as "France" 302. The same actions are repeated for the remaining search terms that the user desires to be in the same search phrase.

Similarly, the user may also wish to conduct a second related but different internet search on a phrase made of the words and phrases appearing later in the same article: "unions" 312, "leftist opposition" 314, "Dominique de Villepin" 316. Once again, in accordance with one form of the invention, the user highlights and clicks on the first term "unions" 312, calls up the SEARCH menu 310, and assigns ranking "2" or alternatively the color yellow to that term. At that point, the term "unions" 312 would either change to a light yellow highlighting or text (but still transparent) color or hue. Next, the user highlights the phrase "leftist opposition" 314, calls up the SEARCH menu 310, and again assigns ranking "2" or alternatively the color yellow to that phrase. At that point, the phrase "leftist opposition" 314 would also change to a light yellow highlighting or text color or hue, thus visually indicating that it is in the same search phrase as the term "unions" 312. The same actions are repeated for the remaining search terms that the user desires to be in the second search phrase.

If desired, one of the search terms from the first search phrase, such as "France" 302 can again be selected and grouped also in the second search phrase, by also being assigned the search phrase number 2. Thus, the invention provides the flexibility for key search terms to be repeated in different search phrases. In such circumstances, the color or highlighting of terms present in multiple search phrases can be made to flash, or may be assigned another unique color or indicator. Alternatively, this common key word may have part of the word highlighted in one color while another part of the word is highlighted in another color. For example, the top half red with the bottom half yellow according to the preceding examples and color selections.

As an alternative, or in addition, each term in a search phrase can have an alpha-numeric indicator assigned to it in the form of a superscript, subscript or otherwise with the same number (or letter) as the search phrases to which it is assigned. Though not shown, using the example above and referring again to FIG. 3, each of the terms in the first search phrase (i.e., "France" 302, "Eiffel Tower" 304, "protest" 306 and "labor law" 308) will be assigned a superscript "1." Similarly, each of the terms in the second search phrase (i.e., "unions" 312, "leftist opposition" 314, "Dominique de Villepin" 316) will be assigned a superscript "2". Still further, if the term "France" 302 was also included in the second phrase, then both superscript "1,2" will appear with that term. In this familiar manner, the user can also see visibly how each term is grouped for search purposes.

In yet another alternative, the user defines the search phrase by highlighting a phrase of consecutive words that includes both desired substantive key words and undesired non-substantive words (such as "a," "and," "the," etc.). The user may then indicate with input device (such as by right, left or double clicking) which non-substantive words to delete from the search phrase, thereby leaving only the desired, substantive key words. Still further, the use may use this method to eliminate substantive words that are not desired to be operate as key words. Alternatively, the user may apply automatic filtering to the phrase to automatically discard non-substantive words.

As will be discussed further below, and particularly when using the invention in text editing programs such as email or word processing programs, the invention provides the option of returning the search results (or some selected number of "top" results) to the actual document in the form of footnotes or endnotes. The user will then be able to "jump" directly to the results by clicking on any of the highlighted terms associated with the desired search phrase. However, using the superscripts in the body of the viewed documents also enables the user to "jump" easily from the search term to the desired group of results by clicking on the specific superscript. Thus, using as an example the term "France" 302 being used in both search 1 and search 2 in the example above, the user can click on either superscript "1" or "2" to jump to the corresponding group of specific results.

In this manner, the user has, while viewing a single document, formed two fairly specific and meaningful, but different, search phrases, each made up of multiple words dispersed throughout the article. This specific form of menu 310 is shown for example purposes only. Any method of highlighting the text, word or phrase, and causing a pop-up "SEARCH" menu to appear, may be used. Thus, for example, speech synthesis, touchscreen, eye gaze tracker, mouse balls, etc. can be used to highlight the text or otherwise input selection data to the computer. Moreover, it is contemplated the user can select or initiate the SEARCH menu of actions by selecting a special button on a toolbar installed in the underlying program, hovering over the text, or clicking on it, or placing the tooltip (i.e., cursor) over one of menu options typically listed at the top of the window (i.e., File, Edit, View, Insert, Format, Tools, etc.) and clicking. Still further, while numbers and colors are used in the search menu 310 as a convenient way to select and group search terms, other alternative forms can be used (for example, even using sounds, icons or other graphic indicators, etc.). The significant point is to allow the user to individually select search terms and link them together to form search phrases. Also, while Microsoft Internet Explorer is the underlying application shown, in fact any text or graphics program could be used (such as a word processor, presentation program, spread sheet program, email program etc.) as the underlying application.

Figure 4:
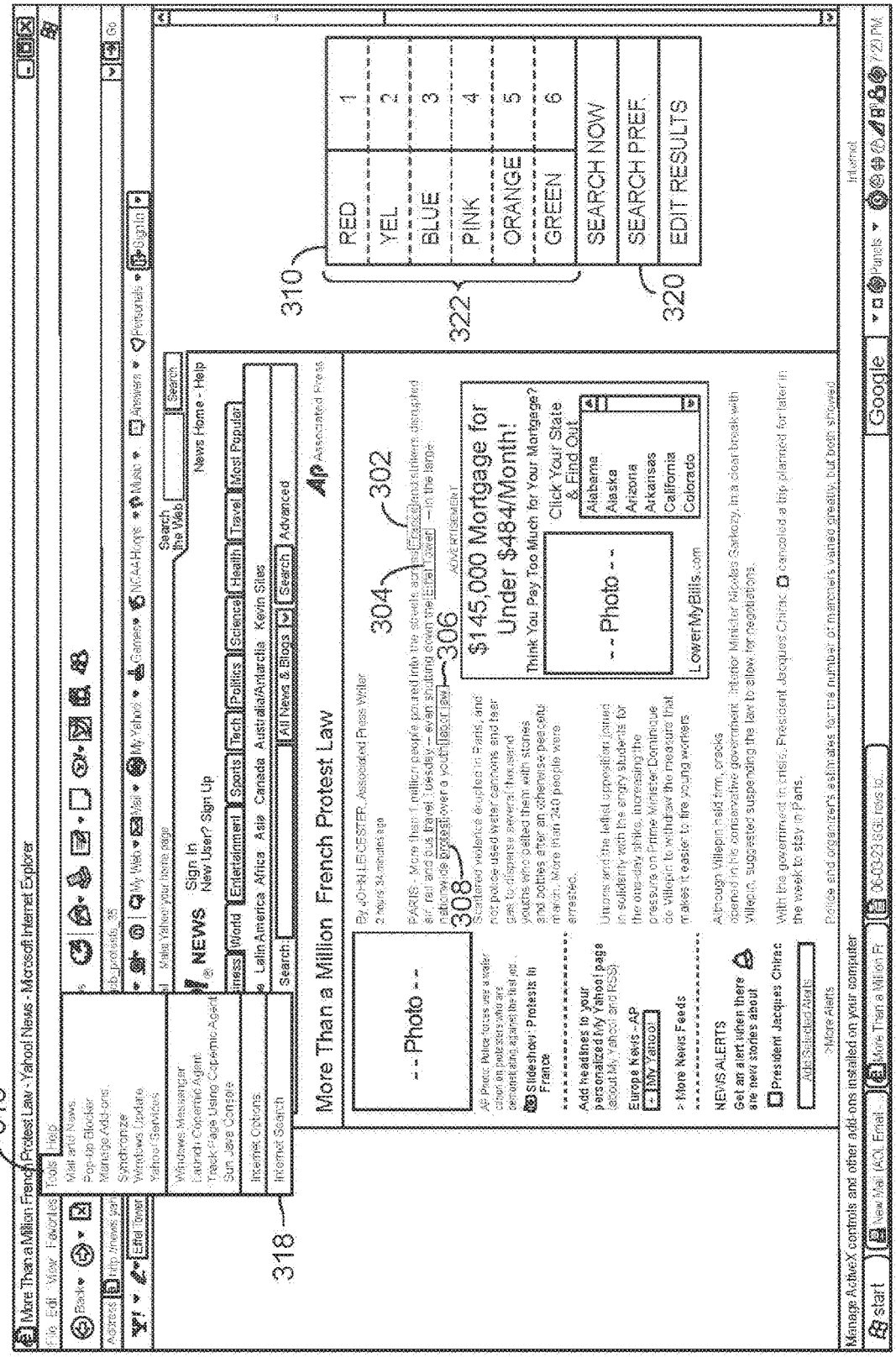
FIG. 4 shows a typical existing form of popup menu.

For example, and referring now to FIG. 4, one of the above-mentioned alternatives for invoking menu 310 is shown. In the embodiment of FIG. 4, after the user highlights the search terms 302, 304, 306 or 308, the user moves the cursor up to the "Tools" menu 316. By "pulling down" the "Tools" menu 316, a line entitled "Internet Search" 318 is revealed. By causing the mouse pointer to hover over or by moving the mouse pointer onto the Internet Search menu item 318, the nested "Search" Menu 310 may be caused to popup or otherwise appear. Alternatively, the Internet Search menu can appear as a "hidden" toolbar on the side or top of the screen, appearing after the search key word is highlighted and the pointer is moved to the top, bottom or sides of the screen.

Thus, in accordance with the invention, the typical tool bar menus may be augmented with vastly improved SEARCH features that will greatly enhance the ability to efficiently conduct comprehensive internet research on selected topics that are being addressed in viewed text documents. In the simple example of FIG. 3, rather than having to separately enter each keyword into the search menu, and viewing the results in a separate window, the user may quickly highlight and group keywords in multiple related and focused internet searches, conduct the searches in a seamless manner, and return the results within the same document he or she is viewing. Enormous amounts of mundane text entering are saved, and complex and time consuming text copying are eliminated.

From the SEARCH menu, however invoked, the user may then select a search group identifier, such as a color, number or equivalent indicator (e.g., sound), to associate with the selected word or phrase. By invoking the SEARCH menu, the user highlights and groups keywords (or graphics) into distinct search phrases by assigning unique indicators to correspondingly grouped key words. In this manner, the user preferably builds a number of search categories, associations or grouping of words or phrases that will be submitted to the search portal as the query terms when the user initiates an internet search. As another alternative, the search terms can be spell checked before being routed to the search portals.

The specific search portals that may be used are variably selectable. For example, the SEARCH menu 310 includes provisions for assigning not only a grouping indicator (i.e., the numbers "1," "2," "3" or colors red, green, blue, etc.) to each search phrase, but also to select which one or more search portal(s) should be used to conduct the search. For example, Search Group 1 may be routed to Google, while Search Group 2 is routed to Yahoo, and Search Group 3 is routed to DogPile. Alternatively, the searches may be routed to a program such as Grokker or Copernic Agent.

In one form of the invention, the SEARCH menu 310 includes a "PREFERENCES" menu item 320. By selecting this option, the user can initiate a sub-routine that allows the selection of preferences for all searches. Then, if the default setting is acceptable, the user may bypass the operation of individually selecting the search portal to be used for each search phrase. However the user may also override the PREFERENCES setting by invoking the specific portals through the SEARCH menu for each specific search phrase. For example, this may be done by "hovering" over the individual search phrase indicators 322 in menu 310. Hovering over any of the specific search indicators 322 will call up a nested menu (not shown in FIG. 4) which will enable the user to select any of the many well known search engines or programs for that particular search phrase.

Figure 5:
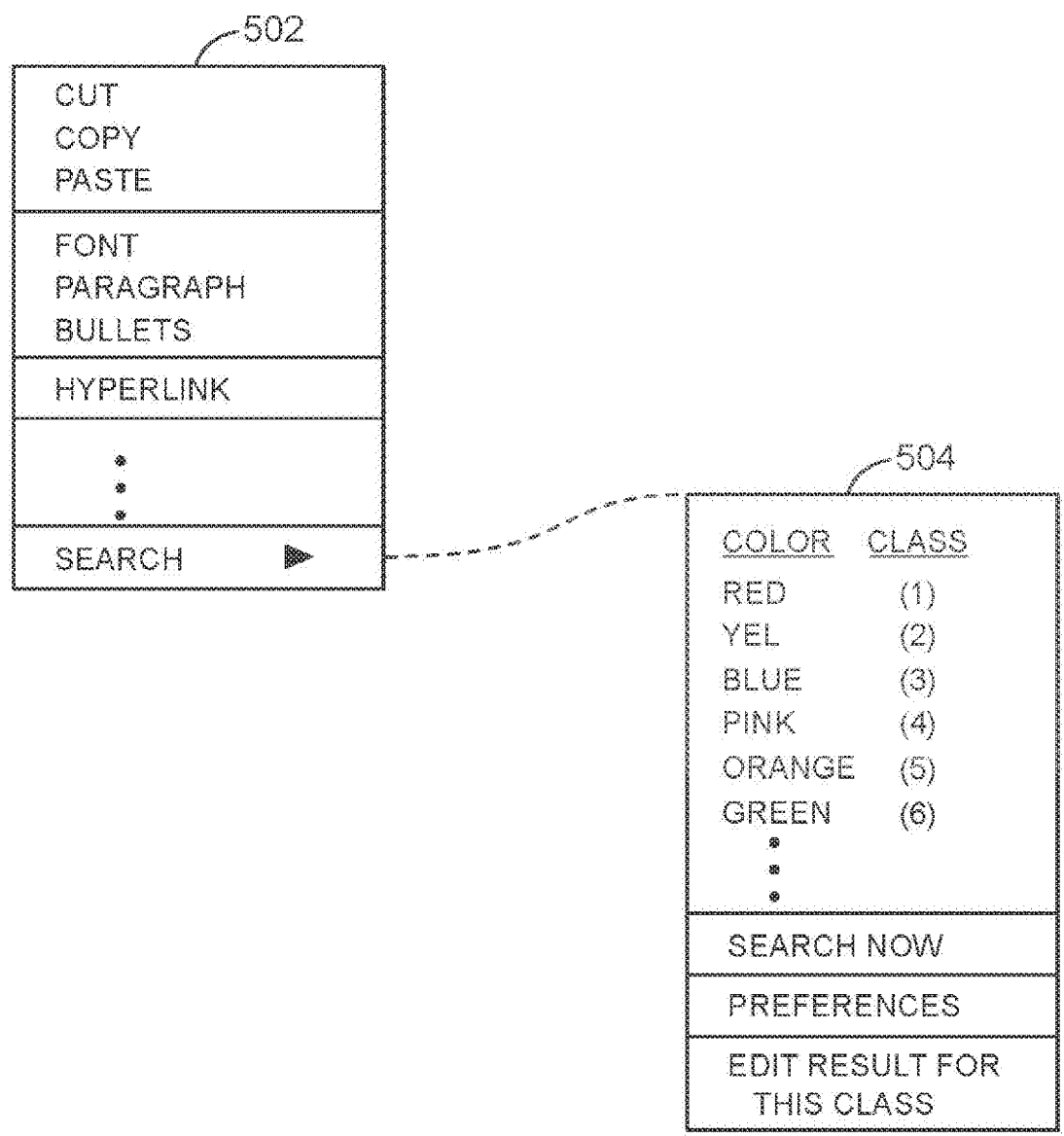
FIGS. 5, 6 and 7 show various forms of popup menus in accordance with the inventions.

Another example of the form of menus contemplated for use with the invention is shown in FIG. 5. Preferably, a standard menu 502 in any applicable program is initiated in the normal procedure familiar to those skilled in the art. Included on menu 502 is a "SEARCH" indicator 503, which when selected, will pop up the SEARCH menu 504. For example, the user may select or highlight a desired search term, then may initiate menu 502 by any applicable or known method, such as speech synthesis, left clicking, gaze tracking, etc. Once the menu 502 is initiated, the user may select the SEARCH operation by similarly known methods, such as dragging the cursor down and releasing, single clicking, double clicking, hovering, etc. on the word "SEARCH." Doing so will cause the more specific search menu 504 to pop up. The user then is allowed to initiate any of a plurality of actions specific to the SEARCH operation. This can be done either by dragging the cursor from the "SEARCH" term over to the left or right on top of the now appearing menu 504. The user can then move up or down on menu 504 to select any of the more specifically configured operations. For example, the user can select the highlighting colors or class enumerations for grouping associated search terms. Once search terms are grouped or otherwise linked together, the user can again invoke menu 504 or an appropriately designated hot key to initiate the internet search. Alternatively, the user can invoke a separate "PREFERENCES" menu as described in more detail below. Still further, the user can similarly invoke a submenu that will allow editing of the results after the search is completed.

The above description of the "SEARCH" sub-menu 504 is given by way of example only. Instead of a sub-menu, a tool bar of icons can also be used. Still further, a disappearing side bar or hover bar can be used. Alternatively, speech synthesis programming can be invoked to bypass visual menus. Also applicable to initiate the operations is a touch screen, mouse, touch pad, or series of programmed hot keys. These various configurations are to be considered alternative equivalents to the sub-menu 504 shown in FIG. 5 and described above. Likewise, instead of the SEARCH indicator 503 being present on a menu 502, it too can be eliminated completely, allowing menu 504 to be invoked simply by left clicking or hovering over the desired search term, by clicking on a menu bar icon, or by employing speech synthesis. The point is to use existing and familiar "menu," "icon," or "toolbar" programming techniques or methods to allow the user to easily group or link the various search terms for the desired search phrases, initiate the SEARCH operations, define the PREFERENCES (see menu 602), or EDIT the results. Still further, these goals are accomplished while eliminating significant text entering.

When the SEARCH is actually initiated, according to another aspect of the invention, a first linked category or group of the query terms (for example, those highlighted in red or assigned the number "1") forming a search phrase are routed to selected search portal(s) as defined in the user's preferences list of the invention. In one form, the search phrase is routed to the portal via an HTML message as is well known in the art. Similarly, the search results are received or communicated back to the program from the search portals. Again, the results may be returned via HTML messages from the selected search portals.

Alternatively, when the computer on which the software is running is connected to the internet, the invention can cause the user's web browser to be invoked in the background and to navigate to the search engine(s) indicated to be used for searching. It can then automatically "paste" the search terms into the search portal's search bar and cause the search to be run. The invention preferably then pastes the results that would be displayed in the web browser into an internal buffer, and then to the document from which the search phrase was initiated, for interactive use by the user (preferably by the user's preference settings).

Figure 10A:
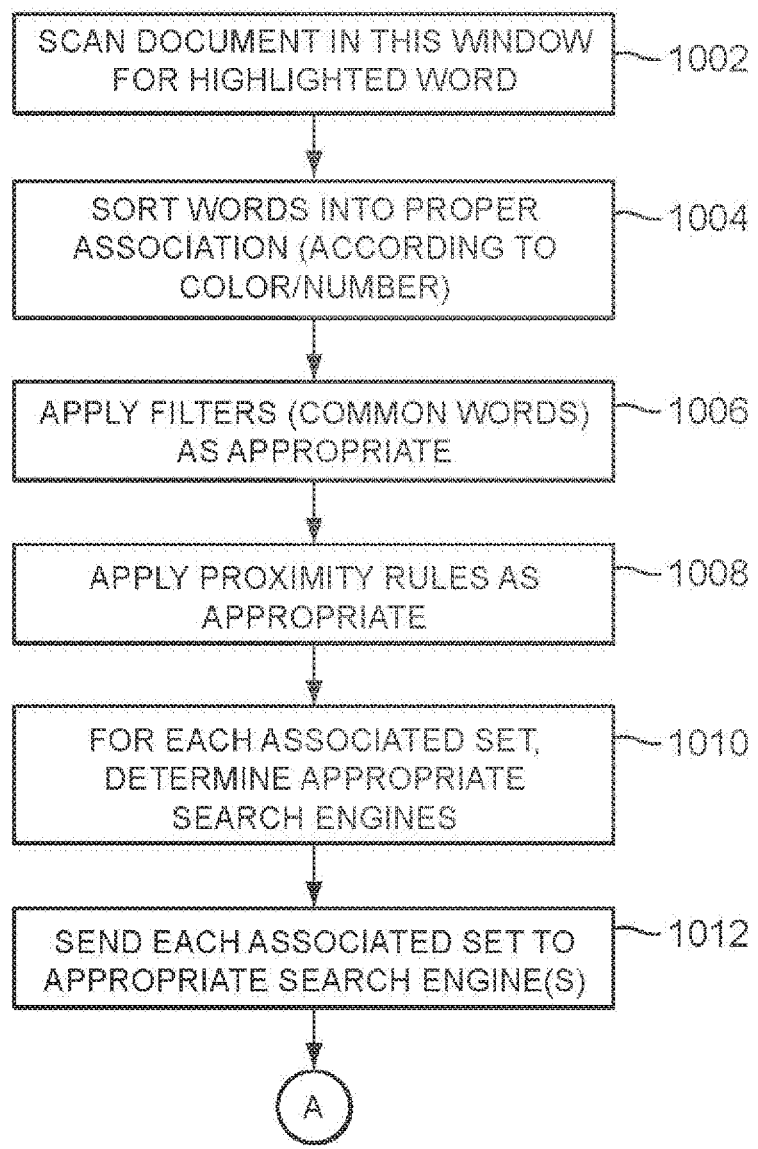
FIGS. 10A and 10B show methods that conduct searches according to various aspects of the invention.
Figure 10B:
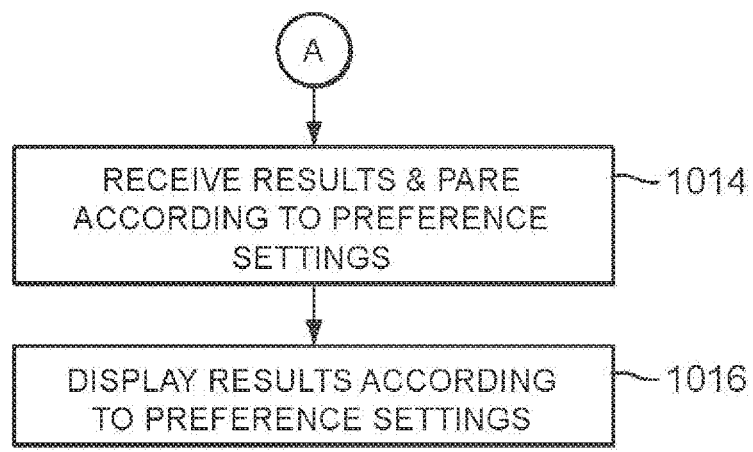

When using this alternative approach, as will be appreciated by those skilled in the art, it is a design choice as to whether the web browser is actually displayed on the screen when invoked or is merely run with its window "hidden." In either case, the search phrase comprised of specific search key words or terms is formulated from the viewed document, routed to the search engine or program, and the results seamlessly returned to the same viewed document in accordance with user's preferences. This process is repeated for each phrase, or alternatively, all phrases are sent via a single activation of the "SEARCH NOW" command 324 shown in menu 310 of FIG. 3. FIGS. 10A and 10B show an exemplary method comprising a form of this aspect of the invention.

Specifically, referring to FIG. 10A, a sub-routine of the invention scans the document active in the search window for highlighted or otherwise indicated key terms, as shown at operation 1002. Next, the sub-routine sorts the search terms into separate search phrases in accordance with the indicator (for example, color or number) selected by the user, as reflected at operation 1004. As discussed below, various filters or spell checkers are then run, as indicated at operation 1006. In addition, proximity rules are applied, if selected by the user, to limit search results to those "hits" in which the identified search terms are within the same (or other selected) proximity as they exist in the active document viewed by the user, as reflected at operation 1008. The sub-routine then determines for each separate search phrase the assigned search engines or programs, as reflected at operation 1010. If desired, multiple search engines or programs may be selected for each search phrase. The individual search phrases are then routed or sent to the defined search engines or programs, as reflected at operation 1012. The appropriate search results from each engine are returned, filtered, pared and/or summarized as appropriate and as defined by the user's preference settings, as reflected at operation 1014 and as described in greater detail below. After the results are returned and filtered, they are displayed in the active document in accordance with the user's preferences, as indicated at operation 1016.

As discussed above, search results are returned for each search phrase and are then preferably checked and/or filtered according to specific user preference settings. This filtering will include scanning to determine if duplicate findings exist within the search results for the category or group arising from the use of the several disparate search engines selected for such search. If such duplicates are found, they are removed. Preferably, the scanning and comparing is done based on the URLs of "hits" returned by the search engines or programs, though other methods are contemplated (such as actual comparison of results). Likewise, the results may be scanned and ranked according to relevance, and according to the user preferences, only a set number of unique results will initially be returned to the document. However, in this situation, the remaining search results (which were not returned to the document) are retained in a buffer for later use should they be required.

For example, assume the user has set the search preferences indicating that the results returned to the document should be displayed in a footnote, endnote or hover window, and further, that only the five most relevant, non-duplicate, results from the search portal or program for the first search phrase should be returned to the document. The user may then click on any of the key word terms in the first search phrase, and "jump" to the five results (which will be contained either in a correspondingly numbered window, endnote or footnote. Upon jumping to the results, the user will see the five hyperlinked results and, preferably, also a summary of pre-defined length (e.g., 25, 50 or 100 words, as set by the preferences menu). The user may also set in the preferences menu an option to have the key words in the returned results highlighted in the same color corresponding to the specific search group, as indicated in menu 310. The user may then proceed to review the returned results, and if desired (either by clicking or selecting pull down menus), eliminate individual results. As each result is eliminated, the next most relevant result stored in the buffer will automatically be displayed (in this example, as one of five results). In this manner, the user may refine and focus the results. If desired, the user may also click on the hyperlink typically contained in search results to preview or review the actual associated website in a separately launched window, or in a pop-up menu within the active document.

Although not shown in the figures, in a modified form of the invention, as the user is reviewing the search results, he may click on or otherwise indicate any of the search terms (or on the footnote or endnote indicator) to cause the associated search phrase(s) to pop up in a separate window (s). At that point, the user may alter or change the search terms or phrases, right or left click on the newly modified phrase, and cause a new search to take place, with the new search results appearing in yet another footnote, endnote, hover window, etc.

For example, if the user is reviewing Search 1, he may click on the superscript "1" and cause the entire associated first search phrase to appear. The user may then edit the first search phrase to change one or more of the terms, and thereafter initiate the search as described above. The results will then preferably appear in a footnote, endnote, hovernote or pop-up window with the related superscript "1.1" or "1(a)." In this manner, the user may further refine his or her searches and search results, without losing the original search results. Once again, the user may review and eliminate various search results for search "1.1," and if desired, conduct a modified form of search "1.1," with the results returned in a footnote, endnote or hover note assigned the related superscript "1.1.1," for example As a further alternative, the user may conduct a second modified form of search 1, which are returned in related window, footnote, endnote or hover note numbered "1.2." Of course, other forms of indicators (such as are commonly used in numbered or lettered wordprocessing outlining programs) can be employed and customized. While the above description shows a presently preferred nesting of results based upon modified searches (and still further modified) searches, other nesting forms are contemplated as well.

In the above manner, the user can easily and efficiently conduct comprehensive and varied searches on focused subjects within the viewed or active document, while at the same time easily and efficiently reviewing, editing, filtering, recording and saving the results. Specifically, when the viewed document is saved to a disk, the search results (including all associated data, such as the hyperlink and summaries) are also saved either within the document or as a linked file to the document. Thus, in accordance with the invention, the results may be displayed in varying formats according to preference settings specified by the user.

Figure 6:
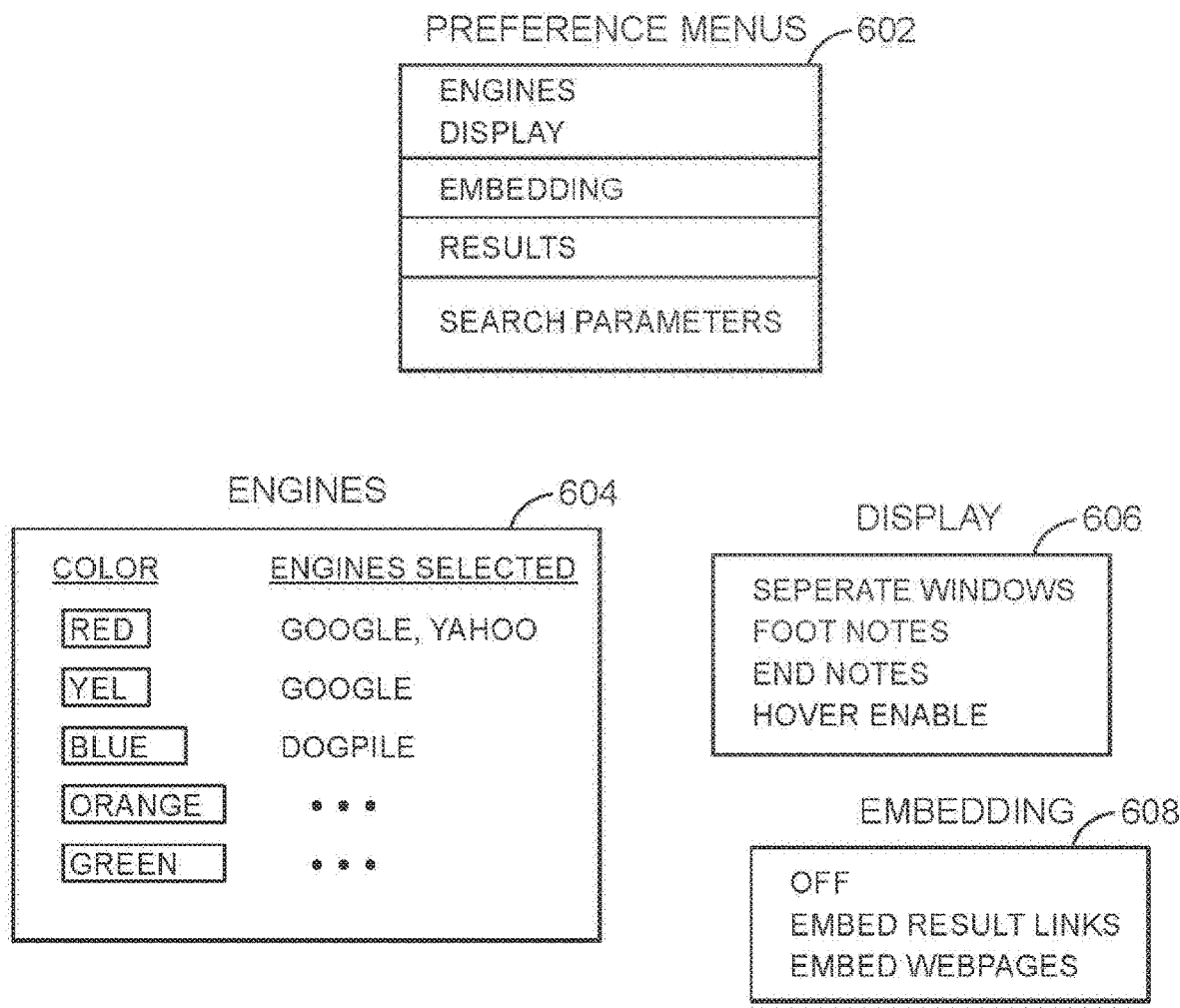
Figure 7:
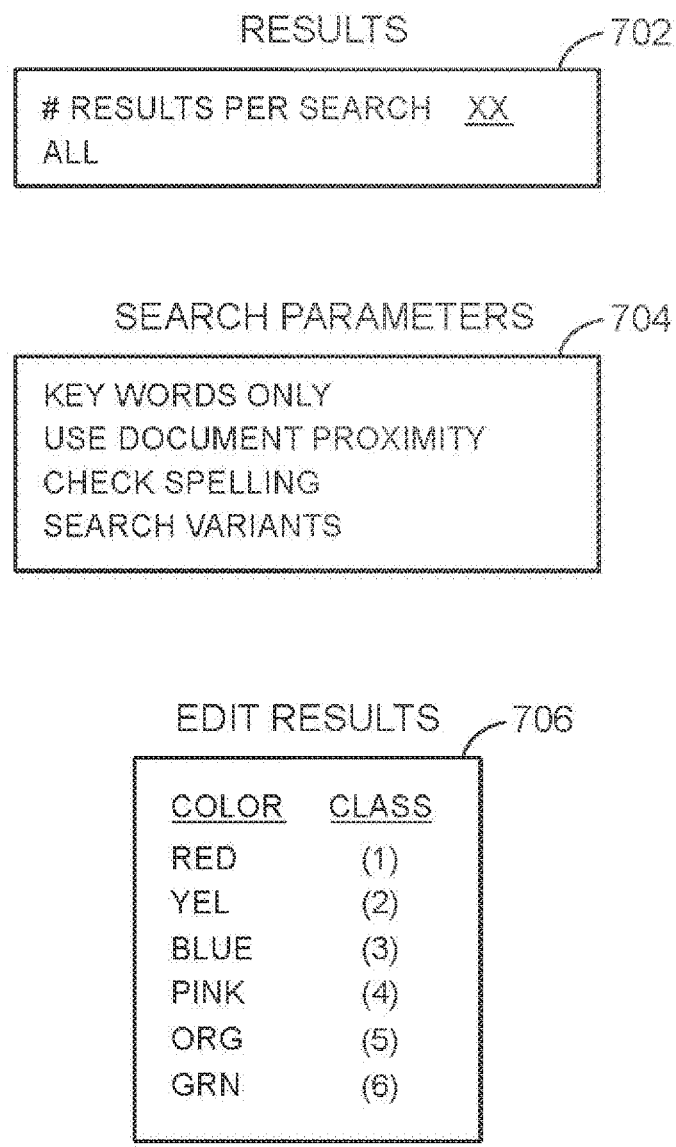
Figure 11:
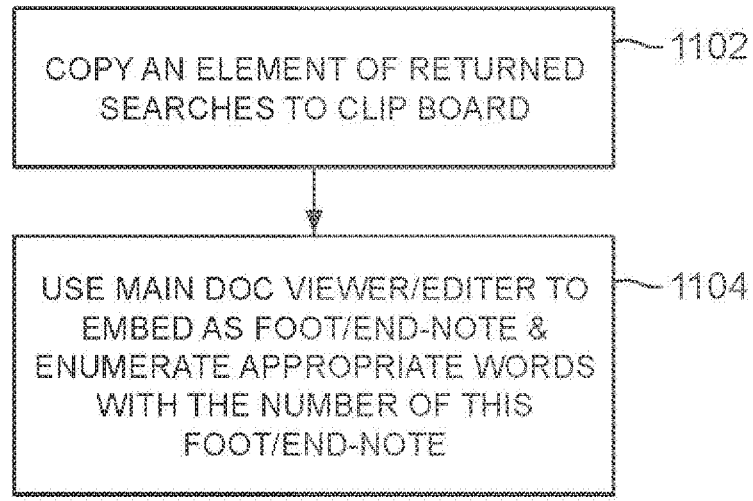
FIG. 11 shows methods that embed search results as footnote or endnotes according to the various aspects of the invention.

Exemplary preference menus are illustrated in FIGS. 6 and 7. One contemplated display preference is to display the results in a separate window that opens to show the individual results of the various categorized searches that performed (606). Preferably, the individual results are color coded to match the color code of the search category which generated a corresponding result. FIG. 6 shows a form of menu in accordance with the invention. A search engine menu 604 allows selection or viewing of a color coding associated with search engine selections. According to another preference, the results are displayed in the document being composed or reviewed as footnotes, preferably as one footnote each for each separate result returned (i.e., for each hyperlink returned), with reference numerals to the footnotes automatically generated and attached to the corresponding words or phrases in the document which generated a given item of a given search result. Another preference preferably provides for the results to be displayed as endnotes to the document, again, with preferably automatic numeric designation and number-attachment to appropriate words. In that regard, with reference to FIG. 6, an embedding preference menu 608 allows selection between: "OFF", "EMBED RESULT LINKS," or "EMBED WEBPAGES." Preferably, the footnotes or endnotes are incorporated into the document through automated use of the Windows clipboard copy and paste features by the invention, and using the formatting routines of the program being used to view or compose the document to format and embed the footnote/endnote. An exemplary method according to this aspect of the invention is depicted in FIG. 11. With reference to FIG. 11, at act 1102, an element of a returned search is copied to the clipboard. At act 1104, the element of the returned search is embedded as footnote or endnote in the document that is open in the main document viewer. The program enumerates through the elements of the returned search to place the appropriate appropriately numbered footnotes and results in the viewed document.

One preferred method of automatically using the formatting routines of the underlying program is to incorporate macro instruction command strings within the invention. To illustrate, the commands used to instruct a word processor that the following information (which would be previously placed on the clipboard) for a popular word processing program (e.g., Microsoft Word) are contained within the inventive system's code. These instructions are invoked when the user wishes to embed the search result(s) as a footnote (for example) automatically by the invention, and the clipboard contents would be copied to the footnote location for embedding within the document. Preferably, the invention also contains the instructions necessary for marking each key word (i.e, the words highlighted for the search) with the number of the footnote. This process is preferably repeated for each elemental search result (i.e., hit) obtained from the various search engines.

Figure 8:
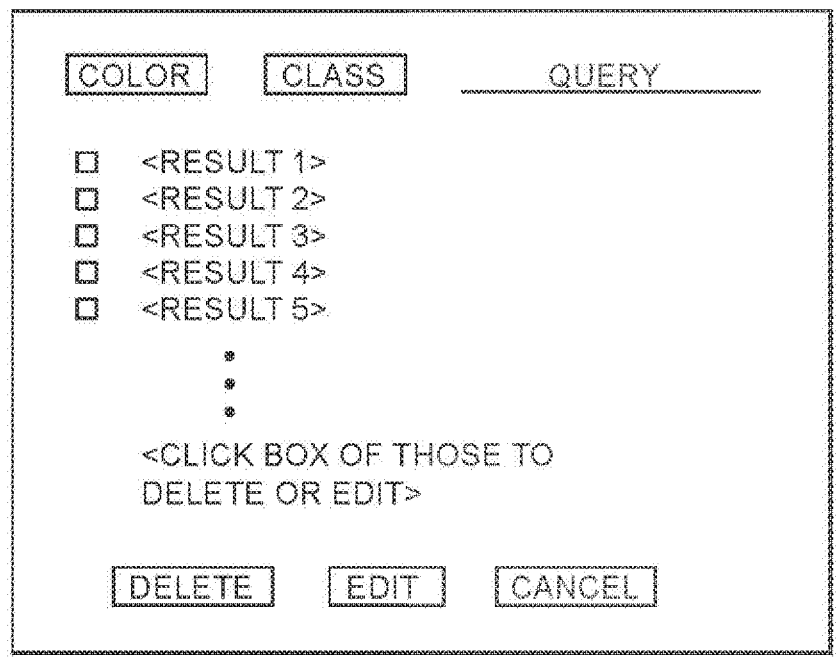
FIG. 8 shows one form of a search result window according to the various aspects of the invention.

According to another aspect of the invention, the user can edit the search results obtained from the various search engines. A preferred exemplary edit invocation window is shown in FIG. 8. It is contemplated that the user can delete specific elemental search results (hits) or reduce the amount of information obtained in the search result (for instance, edit the descriptive information typically returned for each elemental search item) or specify some elemental search results to be embedded within the document while excluding other specific results returned, etc. When indicated that a user wishes to edit results, it is currently preferred that a typical preexisting computer system editor be invoked by the invention, such as windows notepad, or another instance of WORD, or other editor for use as the editing window. The program in accordance with the present invention may also include a text editor.

Figure 12:
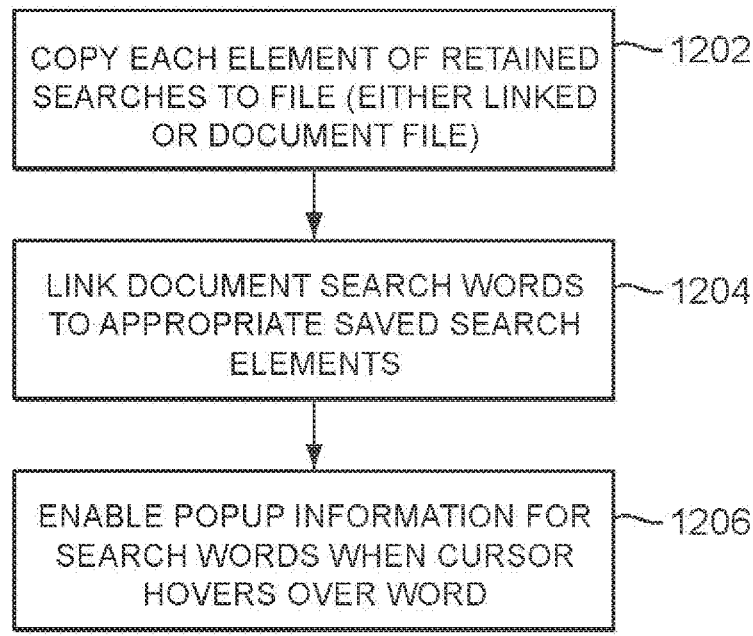
FIG. 12 shows methods that embed a hover-initiated display of search results according to the various aspects of the invention.

According to another aspect of the invention, the user can specify that the search results be hidden but linked to the specific keywords (i.e., highlighted words) that generated the search results and popup for display when the user hovers his tooltip (or mouse pointer) over any of the search words or phrases previously marked within the document and which were used to generate the search results. For example, the search results for words highlighted in red would preferably popup whenever the user hovers his tooltip over words that had been highlighted red (preferably whether still currently highlighted or not). Similarly, this would occur for words in yellow, and so on. In this case, the results are preferably stored in a separate linked information file or files or stored in the currently displayed file under a separate field as information. Furthermore, the words in the current document file are linked to this stored information file so that when a user hovers his tooltip over the word or phrase so linked, the associated linked information results (i.e., search results) for this word or phrase pop up for display in an information window, similar to what is done with internet hyperlinks when a user hovers his tooltip over an internet hyperlink. FIG. 12 shows an exemplary method according to this aspect of the invention. With reference to FIG. 12, act 1202 is "copy each element of the retained searches to file (either linked or document file)." Act 1204 is "link document search words to appropriate saved search elements." Act 1206 is "enable popup information for search words when cursor hovers over word."

For example, according to one embodiment of this aspect of the present invention, a highlighted word, several disparate words, group of words, phrases, etc. result in effectively linking the word(s) to the information embedded and which will popup when the user hovers his tooltip over the previously highlighted items. In this manner, the linked word can now be associated with HTML type code typically used for hover popup tooltips commonly used in the internet art when one hovers his tooltip over a hyperlink and has information popup describing the link or giving its URL address. HTML-type code would include a hover delimiter wherein is stored the results of the associated internet search element(s) such that, when a user hovers his cursor over the highlighted word, the results of the search are immediately displayed. While this aspect of the invention is described with HTML-type functionality, it will be appreciated by those skilled in the art that there are many other methods of achieving the same result such as XML all of which would fall within the spirit and scope of the invention.

Popup information boxes are typically only displayed while the cursor hovers over the hover-enabled words, thus one typically cannot move his cursor into the hover information box to execute a link that may have been returned by the executed search. Therefore, according to another aspect of the invention, when hovering over a hover-enabled word, should the user right click his mouse, for example, there appears the familiar popup menu augmented with the links to webpages returned by the search (and which are preferably popped-up in the information box opened when hovering). By moving his cursor to the link in the popup menu, a user may simply click it and be taken, via his web browser, to the internet page so linked.

It is further contemplated that the search results be bound to the document file, whether by being embedded within the document file or as separate information files which are preferably linked or coupled to the document file, such that the search results are carried with the document file. Therefore, if a user sends the document file as email, moves the document file from location to location, etc., the search results stay with the document file. In this way, a user may, for example, compose a document for emailing, perform searches on terms he feels are of interest, obtain search results, embed the search results within the document (or as an attached information file) for popup viewing when the tooltip hovers over a search word, and then email this whole composition to another user.

The receiving user can then read the document, hover his tooltip over searched words (preferably, whether known to him to have been searched or not) and have the benefit of the sender's search results popup for display as he peruses the document. Furthermore, it is contemplated that the receiving user can right click his mouse on a previously searched word or phrase in this example, to display a popup menu having hyperlinks to webpages which were found during the sending user's search. The user can then click one of the links and be taken to the webpage so linked without ever having performed a search of his own. In this way, the search results found for specific words or phrases in the document generation phrase can be made an integral part of the document. The receiver of the document may also wish to perform searching on the document in the manor described above. He may wish to augment the results he received, change results he received, etc., and the invention contemplates such activity by allowing him to edit results, initiate new searches, embed his result along with or in replacement of the sender's results, etc.

According to another aspect of the invention, relevancy management is preferably performed. For instance, if a user has selected a group of words or phase(s), the invention allows the user to preferably select whether the search should be done on all the words, any of the words, an exact match of the phrase, or allow the addition of words that must not appear in the found document (exclusionary words). Search portals routinely support this type of query (see, e.g., Google.com advanced search capability).

Search portals may allow for queries to be performed on keywords or phrases that must bear a certain relationship to one another. For example, a user specifies a search for all documents containing the word "search" within 5 words of "engine." This type of search is typically called a proximity search. In this way, a user can describe search queries that return more relevant documents. In a preferred embodiment of this aspect of the invention, the invention preferably allows a user to specify such relationships of the search terms. Alternatively, the invention specifies the relationship of the words or phrases from their relationship in the underlying document. To illustrate this aspect of the invention, consider the phrase "the invention relates to the recording of audio sounds on a magnetic wire," and assume the user wishes to perform a proximity search on the terms "invention" and "audio." He may specifically specify the proximity parameters, e.g., invention within 10 words of audio, or according to this aspect, the invention determines that the word "invention" is within 6 words of "audio" and uses this information for the proximity parameter and in generating the proximity search. Alternatively, the invention may be instructed to chose proximities from a set of proximities rounding up or down from those found in the underlying document. To illustrate this point, assume that the proximity of the words in the exemplary phrase is 6. Further assume that this aspect of the invention is constrained by user specification to choose proximities from the set {5,10,15,20, . . . } by rounding up. In this case, the program specifies the search to be "invention" with 10 words of "audio" automatically. As mentioned, the invention contemplates rounding down, use of formulas for proximity generation, etc.

In another aspect of the invention, relevancy analysis is performed independently of the search portal's capabilities. For example, if a user wishes to do a proximity search but the search portal(s) do not support proximity searching, the invention can independently determine proximities of the search words in search results returned by the search portal(s). Specifically, according to this aspect, the invention preferably analyzes the returned results scanning them for the search words and the location of the search words and removing results not found to be within the relevancy specifications provided by the user. As a preferred alternative, the invention can cause the user's web browser to go to the webpages linked in the search results and use the web browser's FIND capability or otherwise to search the webpage text for the search words and determine their relative location to one another and exclude webpages not falling within the dictated relevancy requirements.

According to another aspect of the invention, the user can specify that certain common words are automatically removed from the search. Such common words are preferably specified in a file maintained by the invention and may include words such as "the," "a," "in," "with," "an," etc., for example. It is further preferred that the list of common words be user modifiable. According to this aspect of the invention, these words would be removed from the search terms sent to search portals. For instance, say the user highlighted the phrase "what color is an apple?" to be searched. According to this aspect of the invention and assuming the words "what," "is" and "an" are in the common word exclusion list, the invention would then send query terms "color" and "apple" to the search portal. Preferably, this feature is user selectable, for example from the preferences menu, and alternatively, may be automatically turned off for certain searches, for example when the user has specified that the search is to be conducted on all the words or as an exact phrase. In accordance with this aspect of the invention, the user may add words to the exclusion list by highlighting a phrase to be searched, and then selecting from within the phrase (via any applicable input device, such as by left or right clicking, hovering over, or speaking in a speech recognition system) the words to be "excluded" from the search. The user may select whether the word may be added to the exclusion list for all searches performed from the specific active document being viewed, for example, until the computer is restarted, or for this specific search only. Once added to the exclusion list, the next time a search phrase of connected words is highlighted, the words from the exclusion list will be automatically deleted from the search phrase.

Mistyped or misspelled words being searched upon is a most frustrating experience, and according to another aspect of the invention, selected words and/or phrases are preferably spell-checked before being sent to a search portal. Preferably, the spell checker used by the invention is simply that used in the underlying document composing or viewing software, and alternatively, is a separately provided feature of the invention. FIG. 7 shows a form of menu in accordance with the invention. Search parameters menu 704 provides for various search parameter options such as "key words only," "use document proximity," "check spelling," and "search variants." It will be appreciated by those skilled in the art that spell checking routines are well understood in the art and incorporation of this technology into this aspect of the invention is straightforward. Since many times acronyms or weird spellings of words are desired to be searched, it is contemplated that spell checking be capable of being user enabled/disabled.

According to another aspect of the invention, the user can highlight and mark portions of a word in the document for searching. As a beneficial alternative to this aspect of the invention, the user can indicate that he wants the root form of the selected words to be searched on, rather than the selected, literal word(s) themselves. For instance, specifying root form searching would turn "hunting" in to "hunt," "colored" into "color," "planets" into "planet, "alternatively" into "alternative," etc. Grammar modification of this sort is well understood and is often performed by popular word processing programs; see, for example, Microsoft WORD grammar suggestion capability. It is contemplated that the invention mimic this capability or simply use the grammar dictionary of the underlying document display or creation software in which the document is being viewed.

In a preferred form of the invention, the user may also select a third party search program such as Copernic Agent Professional as the preferred internet search program, rather than have the invention route the search request to the search portal(s) directly. This would enable the user to configure the third party program as a stand alone program, with all the preferences and personal settings that the user desires (see Table 1, below). The search tools of the present invention, once installed in the program being viewed by the user (such as a word processor, spreadsheet, presentation program, internet browser, etc.) would then interface between the program controlling the viewed document and the third party internet searching program.

Purportedly, Copernic Agent includes the specifications set forth in Table 1, repeated at the end of the specification, and includes integration with both windows and various word processing, scheduling, email, spreadsheet, presentation and browser programs. Specifically, Copernic Agent purports to include the following integration:

Windows Integration
  Availability of a Copernic Agent shortcut on the Windows desktop.
  Availability of a Copernic Agent shortcut on the Windows Quick Launch toolbar.
  Availability of a Copernic Agent search extension in the Windows Start menu through the Search command.
Software Integration
  Availability of a Copernic Agent bar enabling users to conduct searches from Word 2000/2002, Outlook 2000/2002, Excel 2000/2002 and PowerPoint 2000/2002 (commercial versions only).
  Possibility of configuring Internet Explorer 4x (or later), Netscape Navigator/Communicator 4.x or 6.x or Opera browser, the system default browser or another compatible browser as the Copernic Agent default browser.
  Availability of displaying a result list in an HTML result page via the default browser.
Internet Explorer Integration
  Availability of the Copernic Agent Toolbar that allows users to trace keywords in Web pages using a highlighting function and tracing buttons, create new searches, set page change tracking, and so on (IE 5.0 or later required).
  Replacement of the Internet Explorer search bar by the Copernic Agent Search component, allowing use of Copernic Agent when the Search button of the Internet Explorer toolbar is clicked.
  Possibility of launching the Copernic Agent Search component for a selected word or group of words directly from any Web page displayed in Internet Explorer using the Search button or a command added to the right-click menu.
  Additional button on the Internet Explorer toolbar and command added to the Internet Explorer Tools menu in order to launch Copernic Agent (IE 5.0 or later requires)
  Availability of a Copernic Agent result bar with advanced browsing features that may be displayed via Copernic Agent or the browser.
  Availability of a HTML search history page to make selection of result lists easier among existing searches.

Figure 13:
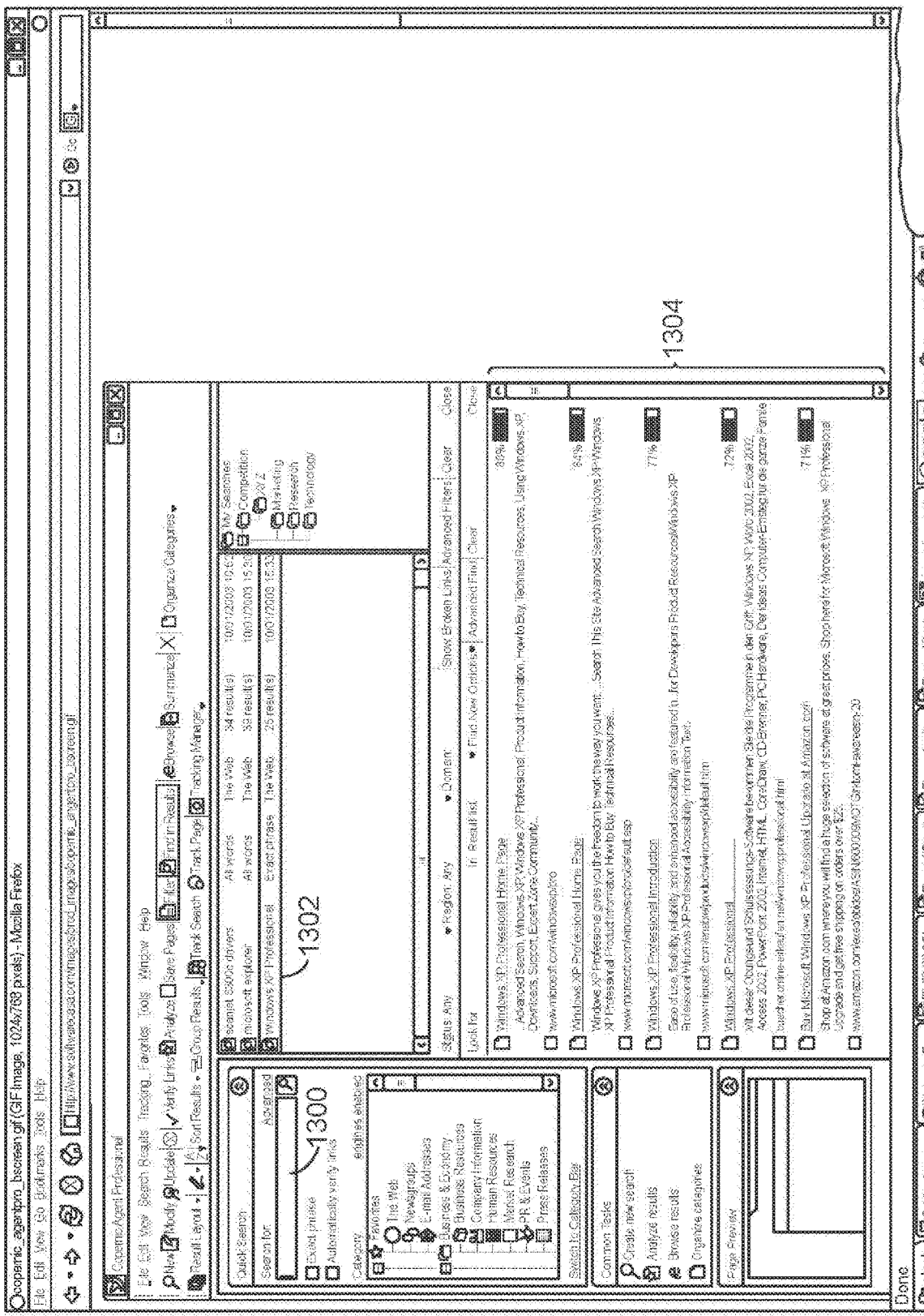
FIG. 13 depicts a screen shot from a third party internet search program, Copernic Agent.

Referring to FIG. 13, a screen shot is shown for Copernic Agent Professional. The screen shot depicts a standard search window 1300, a search 1302 comprised of the words "Windows XP Professional" and a results window 1304 with the search results depicted in accordance with the user's defined preferences (here, sorted by relevancy).

In accordance with the present invention, all of the features of Copernic Agent can be personally configured and defined by the user. An interface program operates between the program controlling the viewed document and Copernic Agent Professional. More specifically, the interface program of the current invention would primarily communicate with the Search window 1300 and Result window 1304 of Copernic Agent Professional, which may be running in the background. Thus, when the user viewing a document defines a search phrase in accordance with the methods of the invention described, for example, in connection with FIGS. 3 and 4, above, and hits the "SEARCH NOW" operation 324, the defined search phrase is seamlessly routed by the interface program to the Search box 1300 of Copernic Agent Professional. Copernic Agent Professional then conducts the search in accordance with the specific preferences defined by the user, returning the Results in window 1304 as shown in FIG. 13.

Alternatively, Copernic Agent may return the results to an HTML results page (not shown). More specifically, Copernic Agent provides the ability for the user to manually export results. This feature allows the user to export search results to a disk in the following file types: HTML, Word (.doc), (.txt), Extended Markup Language (.xml) or Comma Separated (.csv). Specifically, to Export Search Results from Copernic Agent, the user must:

To Export Search Results:
1. Select a search from the search history. If the user wants to export all search results, go to step 3.
2. If the user wants to export selected results only, select each of them using the left mouse button while holding down the Ctrl key.
3. Select the Export command from the File menu.
4. Select the All Results or Selected Results command, as required. The Save As window will then open.
5. Select a destination folder.
6. Enter a file name.
7. Select a compatible file type.
8. Click Save to close the Save As window.

To Export Searches:
1. Select a search from the search history. If the user wants to export several searches from the currently opened search folder, select them using the left mouse button while holding down the Ctrl key.
2. Select the Export command from the File menu.
3. Select the Selected Searches command. The Save As window will then open.
4. Select a destination folder.
5. Enter a file name.
6. Select a compatible file type.
7. Click Save to close the Save As window.

In accordance with the current invention, the interface program will perform the above operations seamlessly. If multiple searches have been routed to Copernic Agent, for example, and the results generated, then the interface program will select and export the search results for each search. If only one search was routed to and conducted by Copernic Agent, then only those search results will be exported. The form of the exported data is a design detail, and would depend on the underlying type of program that is generating the document viewed by the user and from which the searches were generated. In an alternative form of the invention, the results may be automatically placed onto the windows clipboard from the Copernic Agent display window (or buffer), or still further, may be automatically cut and pasted from the Copernic Agent display window (or buffer) into another buffer or file.

Once the interface program seamlessly copies the content of the Copernic Results window 1304 (or HTML results page) into a buffer or workspace memory, the results are analyzed, filtered and modified in accordance with the preferences set by the user in accordance with the present invention, as described earlier in the specification in connection with FIGS. 3-12. FIG. 7 shows a form of menu in accordance with the invention. Results menu 702 allows selection of a number of results per search, or allows a user to receive all of the results from the search. Edit results menu 706 provides for association of colors with search classes. For example, the number of results may be further limited, search terms will be highlighted in the proper colors, formatting will be adjusted to the proper settings, and the results are optimized for display in the viewed document as defined by the user. Thereafter, the filtered results are communicated from the buffer to be displayed in the viewed document.

In accordance with this aspect of the invention, it is preferred that the original search results as exported from Copernic Agent be retained in the buffer. In this manner, as the user modifies, edits or deletes the results returned to the viewed document, additional results may be filtered and communicated for display. Thus, for example, if the user deletes one of the search results, the next most relevant result from the buffer will be communicated to the viewed document for display. In addition, if the user alters the defined search phrase as discussed above, he can select as an option that the modified search be conducted only on the results currently stored in the buffer from the prior search, and further-refined results substituted (or unique additional results) displayed in the viewed document (for example, as the five top "hits").

The above description does not describe the detailed programming code to carry out the defined operations, as it is a manner of design choice in accordance with the references described in the Background of the Invention. Still further, instead of interfacing with an existing third party search program such as Copernic Agent Professional, the underlying functionality of such a program may be incorporated into the present invention. It is preferred, however, that the present invention comprise a relatively simple interface program that is installed to operate as a toolbar or menu in existing programs, to interface with existing search programs or internet search portals.

TABLE 1

Copernic Agent - Specification Sheet

Searches

Search engines and information sources grouped under categories corresponding to their specialization.
Search categories grouped in domains of interest to simplify selection.
Possibility of contacting up to 32 information sources or links simultaneously in order to search results, verify broken links, extract data from Web pages and download pages.
Availability of a free version with no expiration date, Copernic Agent Basic, giving access to more than 90 information sources within 10 search categories: The Web (plus one of the 14 language or country-based category), Newsgroups, E-mail Addresses, Buy Computer Hardware, Buy Software, Buy Electronics, Buy Books, Buy Movies and Buy Music.

TABLE 1-continued

Copernic Agent - Specification Sheet

Availability of two commercial versions, Copernic Agent Personal and Copernic Agent
Professional, mainly focused on business and specialized needs and providing access
to more than 1000 information sources within some 125 search categories.
Possibility of adding search engines and categories, when available (commercial
versions only).
Possibility of creating custom categories with existing engines and categories
(commercial versions only).
Possibility of quickly accessing most used search categories through a customizable
group of favorite categories (commercial versions only).
A quick search bar to make search creation easier in most situations.
Possibility of checking spelling of keywords (commercial versions only).
Possibility of verifying and deleting broken links automatically.
Possibility of extracting data from Web pages (Copernic Agent Professional required).
Possibility of detecting page languages (Copernic Agent Professional required).
Possibility of detecting duplicate pages with non-identical addresses.
Possibility of autonomous removal of irrelevant results following analysis of page
contents with search keywords or a Boolean query (Copernic Agent Professional
required)
Possibility of saving Web pages for offline browsing and searching in found pages.
Possibility of extracting key concepts from Web pages in order to add them in result
lists (Copernic Agent Professional required).
Possibility of summarizing a Web page linked to a selected search result
(Copernic Agent Professional or Copernic Summarizer required).
Possibility of using Boolean operators (AND, OR, EXCEPT, NEAR), parentheses and
quotes to find words in results and analyze Web page contents in order to refine results
(Copernic Agent Professional required for refining of results).
Possibility of automating tasks to validate links, analyze Web page contents, extract
data from Web pages and download them for offline browsing and searching
(commercial versions only; Copernic Agent Personal allows only to automate the link
validation).
A detailed and unlimited search history allowing search follow-ups and various
usages.
Possibility of creating folders and sub-folders for the searches.
Possibility of updating searches to find new results (new results highlighted).
Possibility of modifying search parameters to obtain more accurate results.
Possibility of duplicating a search with all its parameters and results to quickly create
a similar search.
Possibility of copying and moving searches from one folder to the other.
Possibility of e-mailing search results in HTML or text format.
Possibility of exporting search results in various file types: HTML, Word (.doc), Text
(.txt), XML, Comma Separated (.csv).
Possibility of importing results in XML files.
Possibility of sorting searches by keywords, update dates, matches, notes, categories
or schedules.
Results Found results scored and displayed according to their relevancy.
Automatic consolidation of results with identical links.
A detailed result list for each search with extensive information such as result titles,
excerpts, relevancy scores, Web page links and languages, user notes, dates, search
engines and key concepts.
Result lists including visual features such as icons, underlining, bold fonts and colors.
Highlighting of keywords in result lists and Web pages opened with Internet Explorer
(single-color or multi-color).
Progressive display of the results obtained during a search.
A page preview pane to determine the relevancy of results before browsing through
them. Loaded pages are saved in the Internet Explorer 5.x (or later) memory cache to
save browsing time.
A filter bar with multiple and advanced features to filter result lists (features differ
depending on the installed version).
A toolbar with multiple and advanced features to find words in result lists or Web
pages.
Possibility of sorting any result list by titles, excerpts, addresses, scores, dates
found, dates visited, dates modified or search engines.
Possibility of grouping any result list by by scores, states (new, visited, saved,
checkmarked or annotated), annotation contents, dates found, languages, last modified
dates or same contents (commercial versions only; advanced features require
Copernic Agent Professional).
Possibility of annotating results (commercial versions only).
An integrated Internet Explorer Favorites menu, mainly to facilitate addition of
favorites from a result list.
Possibility of deleting results.
Possibility of consulting Web pages during a search operation.
Search & Web Page Tracking (Copernic Agent Professional required)

Possibility of setting search tracking to autonomously retrieve new results on a
periodic basis and report them.
Possibility of setting page tracking to autonomously detect changes on a periodic TABLE 1-continued Copernic Agent - Specification Sheet basis over a default number of words and then report occurred changes by highlighting them in pages.
Availability of preset tracking schedules (multiple times per day, on a daily, weekly or monthly basis) making it easier to set tracking tasks.
Automatic logging onto and off the Internet through the modem at the beginning and end of a tracking schedule.
Automatic sending of tracking reports by e-mail to one or more particular addresses.
Possibility of customizing the default tracking schedules.
Possibility of customizing recipient addresses for a specific tracking task.
Possibility of combining tracking tasks with other automated tasks (e.g. downloading pages, validating links, refining results).
Possibility of grouping together several tasks in the same tracking schedule.
Possibility of postponing indefinitely the execution of tracking tasks, individually or globally.
A tracking task manager with many useful features and shortcuts.
A tracking task progress report while a tracking is underway.
An icon, appearing in the Windows Taskbar, while a tracking operation is underway, that can be clicked to open the tracking progress window.
Customizing & Configuration Possibility of customizing the number of simultaneous transfers (up to 32) for searching, verifying, analyzing, extracting and downloading operations.
Possibility of personalizing toolbars and menus by adding, removing and rearranging buttons and items, creating custom toolbars and using many other related options.
Possibility of disabling or enabling default engines available by category.
A search category manager to customize categories.
Possibility of customizing default maximum numbers of results to report by engine and search for each category and any search (Basic: 300/3000; Personal: 500/5000; Professional: 700/unlimited).
Support of all Internet connection modes, including HTTP or Socks proxy servers (imports configuration from browser, manages the authorization procedure for proxies).
Possibility of changing multiple configuration settings (e.g. visual settings, summaries, e-mail reports, prompts, timeouts).
Possibility of customizing the default browser and Internet Explorer, Windows or software integrations.
Customizable toolbar locations in the main window, Internet Explorer and other integrated applications.
Possibility of customizing search and result layouts.
Automatic engine and software updates with customizable options.
Possibility of entering a new password only once in Windows Task Scheduler for preset tracking schedules of Copernic Agent Professional.
Compatibility Minimum equipment requirements: Pentium 120 MHz, 32 MB of RAM, 15 MB of disk space.
Operating system required: Windows 95/98/Me/NT4/2000/XP.
Browser required: Microsoft Internet Explorer 4.0 or later, Netscape Navigator/Communicator 4.x or 6.x.
Supports multi-user configurations for individual searches and settings.
Windows compliant software uninstall procedure.
Accessibility to the program from Windows Start/Find menu.
Other Specifications Availability of a dynamic menu allowing quick and contextual access to most commonly used tasks.
HTML Help file including fully contextual Help Contents with menus and windows.

What is claimed is:

1. A method of efficiently conducting searches and embedding search results within a document using (1) pre-existing text from the document that is viewable in a text editing program on a screen of a computing device and (2) a searching program that is remotely accessible over the internet by the computing device, comprising:
   a. providing a search-help tool that is installable in the memory of the computing device and that is operable to interface with a searching program and a text editing program resident in the computing device having pointing device input;
   b. configuring the search-help tool so that it can be operated by the computing device to transmit a search phrase comprising words selected from the pre-existing text of the document to the searching program over the internet connection;
   c. operating the searching program to conduct a search and generate search results based upon the search phrase;
   d. communicating the search results to the computing device;
   e. configuring the search-help tool so that it can be operated by the computing device to:
      i. enable at least part of the search results to be displayed within the text-editing program;
      ii. in response to input designating a search result to be embedded, directly embed, within the viewed document, at least some selected text from the designated search result, wherein the input designating the search result to be embedded corresponds to selecting an embedding function that is distinct from general cut and paste, general copy and paste, and general drag and drop commands.

2. The method of claim 1 wherein the pointing device input is a mouse or a touchscreen.

3. A method of efficiently conducting searches from and coupling search results to a viewed document using (1) pre-existing text from the document that is viewable in a text editing program on a screen of a computing device and (2) a searching program that is remotely accessible over the internet by the computing device, comprising:

a. providing a search-help tool that is installable in the memory of the computing device and that is operable to interface with a searching program and a text editing program resident in the computing device having pointing device input;

b. configuring the search-help tool so that it can be operated by the computing device to:
      i. determine words or phrases within the document designated to form at least a first search phrase and a second search phrase, each search phrase comprising words selected from the pre-existing text of the document;
      ii. transmit the first and second search phrases comprising words selected from the pre-existing text of the document to the searching program over the internet connection to the searching program;

c. operating the searching program to conduct searching and generate respective search results based upon and corresponding to the first and second search phrases;

d. communicating the search results to the computing device;

e. configuring the search-help tool so that it can be operated by the computing device to:
      i. enable at least part of the search results to be displayed within the text-editing program;
      ii. couple to the document file at least part of any of the search results, such that at least part of any of the search results are carried with the viewed document file; and
      iii. in response to input designating a search result to be embedded, directly embed, within the viewed document, at least some selected text from the designated search result, wherein the input designating the search result to be embedded corresponds to selecting an embedding function that is distinct from general cut and paste, general copy and paste, and general drag and drop commands.

4. The method of claim 3 further comprising configuring the search-help tool so that it can be operated by the computing device to cause the coupled search results to be stored in a file separate from the viewed document file.

* * * * *